(12) United States Patent
Baven et al.

(10) Patent No.: US 12,147,442 B2
(45) Date of Patent: Nov. 19, 2024

(54) EXPLANATION OF COMPUTATION RESULT USING CHALLENGE FUNCTION

(71) Applicant: SAP SE, Walldorf (DE)

(72) Inventors: Nirmal Baven, Mannheim (DE); Srivatsan Santhanam, Bangalore (IN); Anmol Bhat, Bangalore (IN); Atreya Biswas, Singapore (SG)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/892,893

(22) Filed: Aug. 22, 2022

(65) Prior Publication Data

US 2024/0061851 A1 Feb. 22, 2024

(51) Int. Cl.
*G06F 16/20* (2019.01)
*G06F 3/0482* (2013.01)
*G06F 16/248* (2019.01)
*G06F 16/25* (2019.01)

(52) U.S. Cl.
CPC .......... *G06F 16/248* (2019.01); *G06F 3/0482* (2013.01); *G06F 16/252* (2019.01)

(58) Field of Classification Search
CPC ..... G06F 16/248; G06F 16/252; G06F 3/0482
See application file for complete search history.

(56) References Cited

U.S. PATENT DOCUMENTS

| | | | | |
|---|---|---|---|---|
| 8,740,623 | B2 * | 6/2014 | Walker | G09B 1/36 434/238 |
| 8,838,750 | B2 * | 9/2014 | Zenz | G06F 9/44505 709/219 |
| 9,787,551 | B2 * | 10/2017 | Newton | H04L 41/5041 |
| 9,887,885 | B2 * | 2/2018 | Varney | H04L 41/50 |
| 10,244,114 | B2 * | 3/2019 | Molander | H04M 3/36 |
| 10,528,607 | B2 * | 1/2020 | Dinga | G06F 16/334 |
| 10,833,942 | B2 * | 11/2020 | Apostolopoulos | H04L 41/40 |
| 11,487,603 | B2 * | 11/2022 | Kalia | G06F 11/0751 |
| 2005/0289388 | A1 * | 12/2005 | Black-Ziegelbein | H04L 41/0893 714/6.32 |

(Continued)

FOREIGN PATENT DOCUMENTS

EP 1701245 A2 * 9/2006

*Primary Examiner* — Daniel A Kuddus
(74) *Attorney, Agent, or Firm* — Fountainhead Law Group, PC

(57) ABSTRACT

A framework provides a detailed explanation regarding specific aspects of a (complex) calculation produced by an application (e.g., an analytical application). An explainability engine receives a request for explanation of the calculation. The explainability engine traverses homogenous data clusters according to the request, in order to produce a final path. The final path is used to select and then populate a template comprising explanation note(s). The outcome (comprising the final path and the template) is processed with a ruleset according to a covariance (COV) function in order to provide a first intermediate outcome. The first intermediate result is then processed with a second input according to a correlation (COR) function to provide a second intermediate outcome. The second intermediate result is processed according to a challenge function to provide a challenged outcome, and feedback (e.g., reward or penalization) to the ruleset. The challenged outcome provides detailed explanation to the user.

20 Claims, 30 Drawing Sheets

(56) References Cited

U.S. PATENT DOCUMENTS

| | | | |
|---|---|---|---|
| 2011/0229864 A1* | 9/2011 | Short | G09B 7/00 |
| | | | 434/219 |
| 2014/0344013 A1* | 11/2014 | Karty | G06N 3/126 |
| | | | 705/7.29 |
| 2015/0180725 A1* | 6/2015 | Varney | H04L 41/50 |
| | | | 709/223 |
| 2018/0150546 A1* | 5/2018 | Alexander | G06F 16/2455 |
| 2018/0308011 A1* | 10/2018 | Kalia | G06F 11/0793 |
| 2018/0376000 A1* | 12/2018 | Molander | H04M 3/36 |
| 2019/0158667 A1* | 5/2019 | Molander | G06F 16/248 |
| 2020/0044927 A1* | 2/2020 | Apostolopoulos | H04L 67/561 |
| 2022/0198255 A1* | 6/2022 | Sautier | G06F 40/30 |

* cited by examiner

EXPENSE ENTRY

Explainability Demo MXN 4550

Not Submitted

Report Details  Print  Manage Receipts

| Explain | Edit | Delete | Copy | Combine Expenses | Move To |

| Payment Type | Expense Type | Date | Requested Amount | Taxable Amount | Non-Taxable Amount | Receipt |
|---|---|---|---|---|---|---|
| ○ Cash | Breakfast | 06/11/2020 | 1200 | 200 | 1000 | ☐ |
| ○ Cash | Airfare | 16/08/2018 | 1550 | 800 | 750 | ☐ |
| ○ Cash | Dinner | 14/06/2013 | 400 | 0 | 400 | ☐ |
| ○ Cash | Lunch | 16/04/2017 | 1400 | 0 | 1400 | ☐ |

MXN 4550

EXPLANATION FOR TAXABILITY 1700

The explainability screen helps you to understand the company policy / legal policy associated with the taxation. The expense claims are deemed to taxation based on the rate configurations administered by your company.

| Country/Region-Specific Rule | Rule Effective From | Rule Effective To | Rule Applied |
|---|---|---|---|
| India | 2020-01-01 | 2099-12-31 | Legal Rule |

Taxability Calculation Details ↑

The expense claims are subjected to taxation based on your company's configuration settings. If the expense type has both the legal and the company-specific taxation policy configured, then the company taxation policy takes precedence.

| Data | Value | Explaination |
|---|---|---|
| Expense Amount | MXN 1200 | Amount claimed by the user |
| Transaction Date | 06/11/2020 | The transaction date falls under the Tax regime, 2020 under the India tax slab rates. |
| Tax Limit Amount | MXN 10A | Gross rate amounts below this limit will be exempted from taxation. |
| Taxable Amount | MXN 200 | The tax amount liable for an individual to the India tax authorities for the financial year 2020. |
| Non-Taxable Amount | MXN 1000 | Taxation free amount for the claim. |

FIG. 25

EXPLANATION OF COMPUTATION RESULT USING CHALLENGE FUNCTION

BACKGROUND

Unless otherwise indicated herein, the approaches described in this section are not prior art to the claims in this application and are not admitted to be prior art by inclusion in this section.

Software applications may be utilized by users to perform complex computations having real world applications. As a simplified example, a user may provide inputs to software to calculate a tax owed in a particular country.

While the software may generate a corresponding output to the user, less effort is devoted to offering explanation for the rationale underlying the result. Thus in the simplified example above, the tax owed output calculated by the software, may in fact be dependent upon some particular aspect of the tax code of a specific jurisdiction.

Moreover the tax code may evolve over time. The user may receive a calculated tax amount owed, based on a calculation differing (sometimes in subtle ways) from a previous years' calculated tax. Such opacity in calculation outcome can lead to user confusion and erode confidence and trust in the software.

SUMMARY

A framework provides a detailed explanation regarding specific aspects of a (complex) calculation produced by an application (e.g., an analytical application). An explainability engine receives a request for explanation of the calculation. The explainability engine traverses homogenous data clusters according to the request, in order to produce a final path. The final path is used to select and then populate a template comprising explanation note(s).

The outcome (comprising the final path and the template) is processed with a ruleset according to a covariance (COV) function in order to provide a first intermediate outcome. The first intermediate outcome is then processed with a second input according to a correlation (COR) function to provide a second intermediate outcome. The second intermediate outcome is processed according to a challenge function to provide a challenged outcome, as well as feedback (e.g., reward or penalization) to the ruleset.

The challenged outcome serves as a basis for providing detailed explanation to the user. An interface displays the challenged outcome to facilitate understanding of how particular results are computed—e.g., rule(s) applied per line item of the original calculation result. This affords a user a better understanding of the nature of the original analytical calculation—e.g., by providing explanation of specific rule(s) that were considered.

The following detailed description and accompanying drawings provide a better understanding of the nature and advantages of various embodiments.

BRIEF DESCRIPTION OF THE DRAWINGS

FIG. 11 shows a screenshot of an exemplary system generated output for which explanation is to be requested.

FIG. 25 shows a resulting explanation screen produced according to an example.

DETAILED DESCRIPTION

Described herein are methods and apparatuses that implement explanation of a calculation result using a challenge function. In the following description, for purposes of explanation, numerous examples and specific details are set forth in order to provide a thorough understanding of embodiments according to the present invention. It will be evident, however, to one skilled in the art that embodiments as defined by the claims may include some or all of the features in these examples alone or in combination with other features described below, and may further include modifications and equivalents of the features and concepts described herein.

Figure 1:
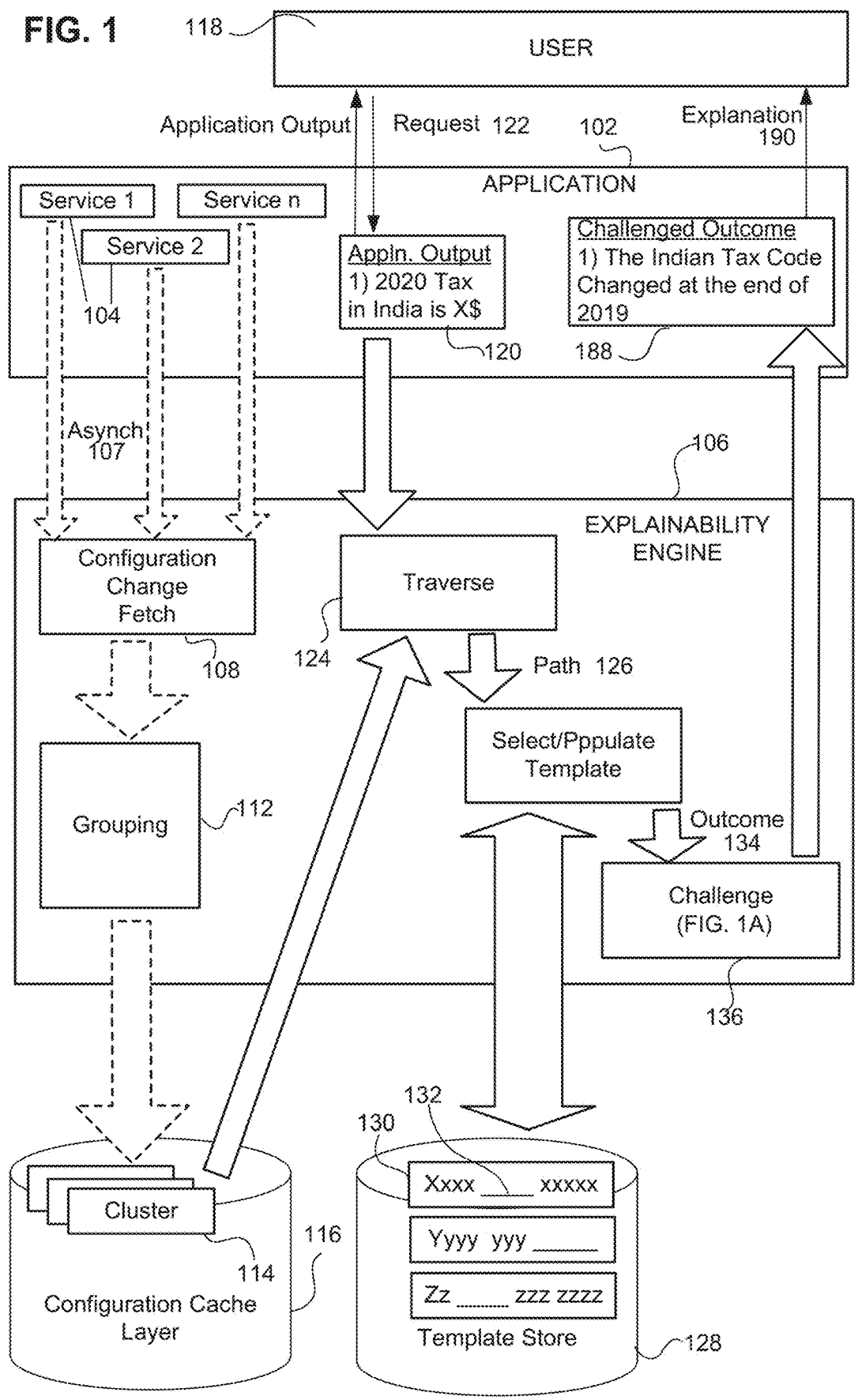
FIG. 1 shows a simplified diagram of a system according to an embodiment.

FIG. 1 shows a simplified view of an example system that is configured to implement a calculation explanation framework according to an embodiment.

Specifically, system 100 comprises an application 102 that includes various services 104. In one possible example, the application could comprise a travel management application, with the individual services comprising a tax service, a country policy service, and an expense calculation service.

The application is in communication with an explainability engine 106. In an asynchronous manner 107 (e.g., according a scheduled job), a configuration change fetcher 108 of the explainability engine is configured to retrieve changed configurations 110 from the services. An example of a changed configuration could be, e.g., a change in the tax code for a particular country (e.g., India) effective as of a specific date.

Upon receipt of the changed configuration(s), the explainability engine is configured to create a grouping 112 of the configuration information into a number of homogeneous clusters 114, and to store same in a configuration cache layer 116.

The application is also in communication with a user 118. At some point in time, the application communicates an application output 120 to the user. In one example, that application output could be a message indicating that the user owes a certain amount in taxes for India.

The user may seek further information explaining the output of the application. For example, the current output of the application may differ some manner from an amount of US tax owed in a previous year. This disparity may raise questions in the user's mind regarding accuracy of the current application output.

Thus embodiments allow a user to communicate a request for explanation 122 to the application. This request may take the form of the user selecting one or more details of the application output (e.g., a particular travel expense line item).

The request for explanation is communicated from the application to the explainability engine. Based upon the content of the explanation request, the explainability engine may traverse 124 the homogenous clusters and generate a final path 126. This content could comprise, for example, the specific country (e.g., India), an expense type (e.g., airfare), a threshold, and/or other information relevant to travel management.

Next, based upon the final path the explainability engine references a template store 128 including various templates 130. Each template comprises an explanation note having blanks 132 present therein. One example of an explanation note could be: "The tax code of the country of_____changed in_____."

Based upon the final path resulting from traversal of the homogenous clusters, the explainability engine selects an appropriate template. The explainability engine then populates blank(s) of the template with relevant information (e.g., "India"; "2020").

Figure 1A:
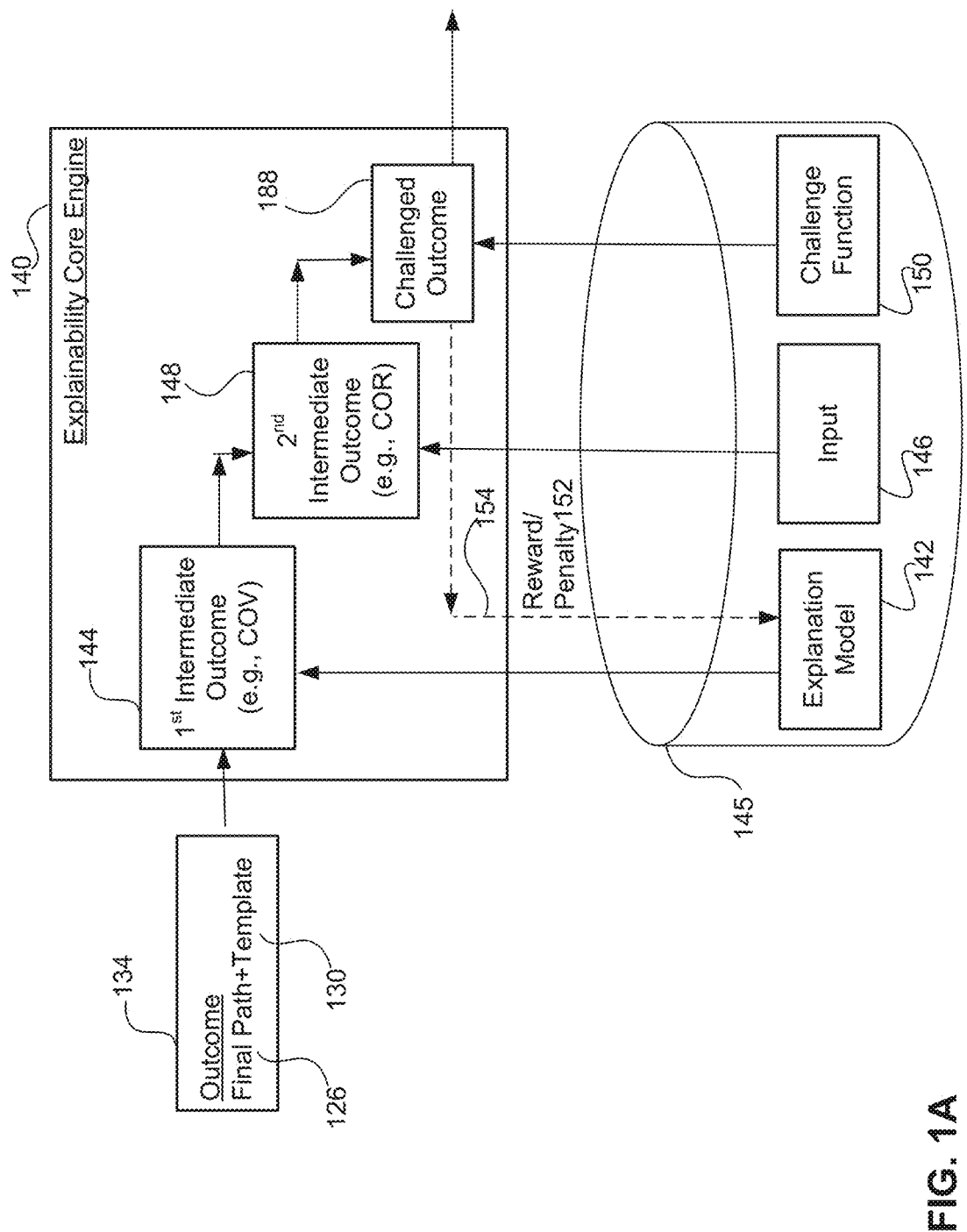
FIG. 1A shows a simplified diagram illustrating one aspect of FIG. 1.

Then, the final path and the template are communicated as an outcome 134 for challenge 136. Details of the challenge are shown in FIG. 1A.

In particular, the outcome is provided as input to an explainability core engine 140. The explainability core engine processes the outcome with respect to an explainability model 142 to produce a first intermediate outcome 144. In some embodiments, this processing may involve a covariance (COV) function. The explainability model is stored in a computer readable storage medium 145.

The first intermediate outcome is then processed according to an input 146 to produce a second intermediate output 148. In some embodiments, this processing may involve a correlation (COR) function.

Then, the second intermediate outcome is processed according to a challenge function 150 to produce a challenged outcome 188. This processing may also produce a reward or penalty 152 that is fed back 154 to the model. Further details regarding one example calculation of a challenged outcome from an outcome, are discussed in connection with the example of FIG. 23.

Once generated, the challenged outcome is communicated from the explainability engine back to the application. The challenged outcome includes language of the populated template, offering specific explanation 190 to the user regarding the subject matter of the original explanation request.

Explanation frameworks according to embodiments may integrate with existing calculation systems. Explanation(s) of calculation results that are offered by embodiments, can allow users to challenge calculation results via hypothesis, permitting validation of a user's understanding and promoting confidence and trust in the calculation system.

Figure 2:
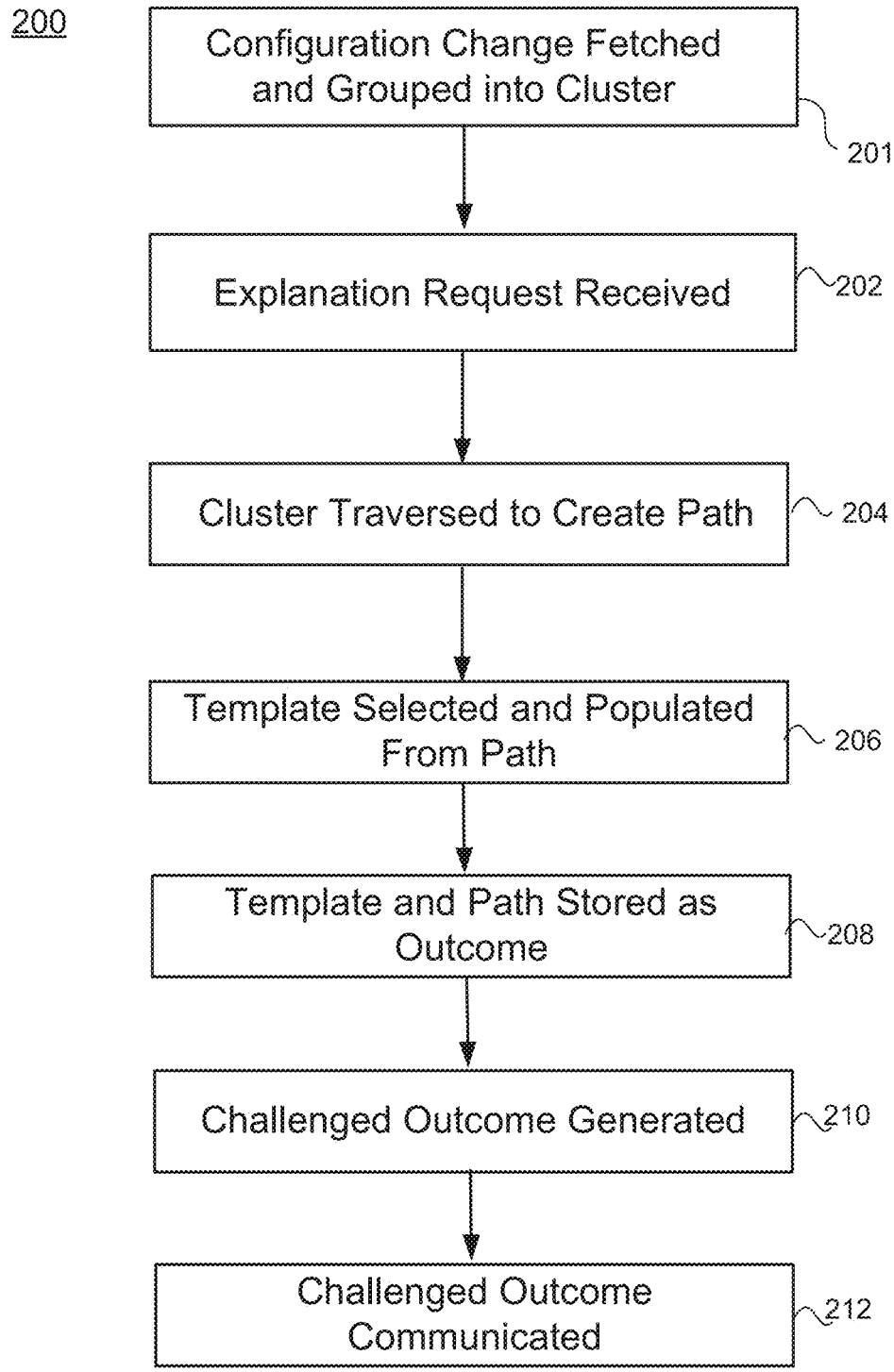
FIG. 2 shows a simplified flow diagram of a method according to an embodiment.

FIG. 2 is a flow diagram of a method 200 according to an embodiment. In a preliminary asynchronous phase, at 201 a configuration change is fetched from a service of an application, and grouped in a cluster.

At 202, an explanation request is received from the application.

At 204, based upon content of the explanation request, the cluster is traversed to create a final path.

At 206, based on the final path a template is selected and populated. At 208, the populated template and the final path are stored as an outcome.

At 210, the outcome is processed according to a challenge function to create a challenged outcome. At 212 the challenged outcome is communicated to the application.

Further details regarding generic parsing according to various embodiments, are now provided in connection with the following example.

Example

An example of an embodiment of an explanation providing framework is now described in connection with the CONCUR system available from SAP SE of Walldorf, Germany. In particular, this example illustrates the building of trust with CONCUR users by providing intelligent explanation descriptions regarding compliance with legal requirements involving taxation.

Figure 3A:
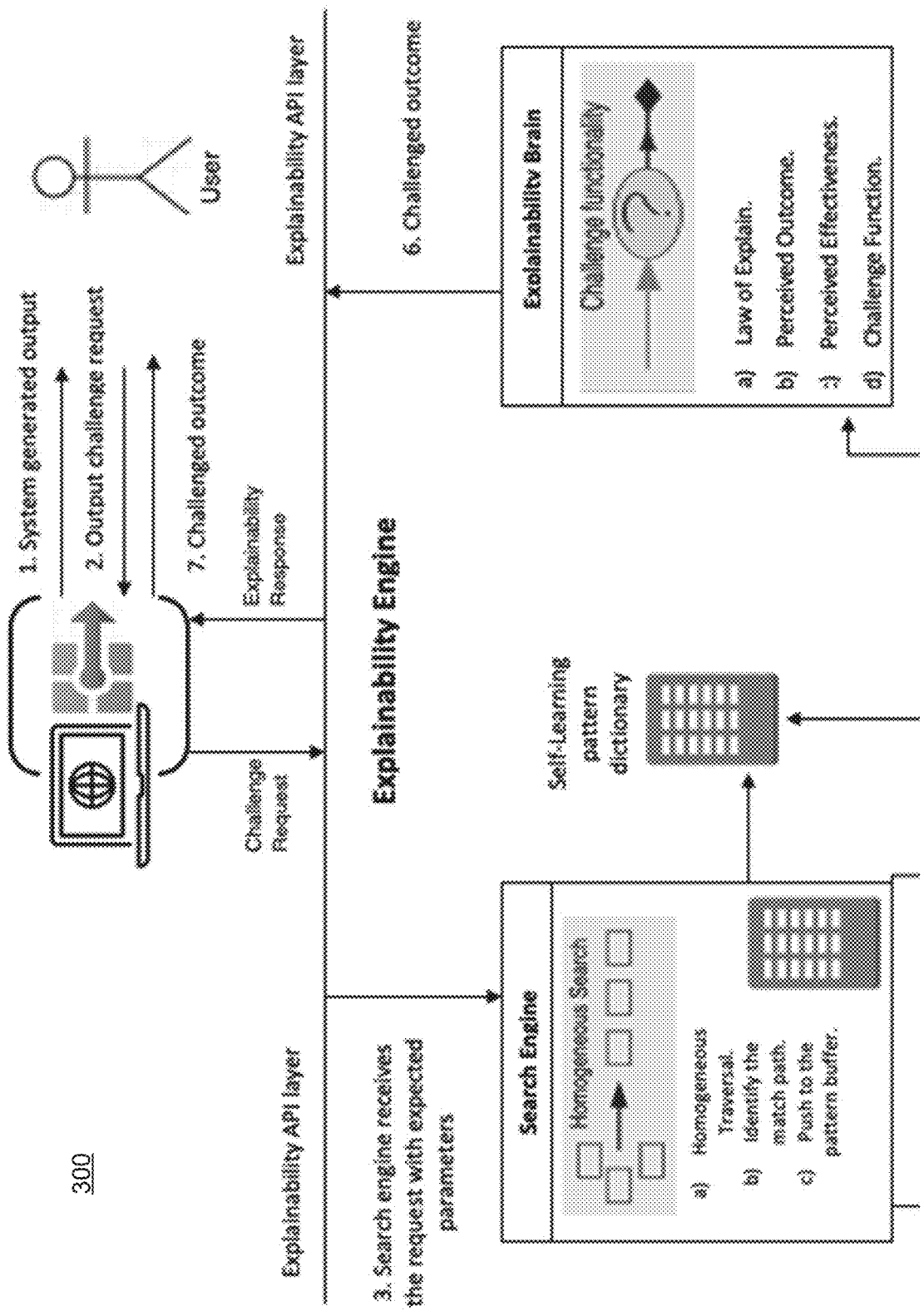
FIGS. 3A-3B are simplified diagrams showing operation of an explanation framework according to an example.
Figure 3B:
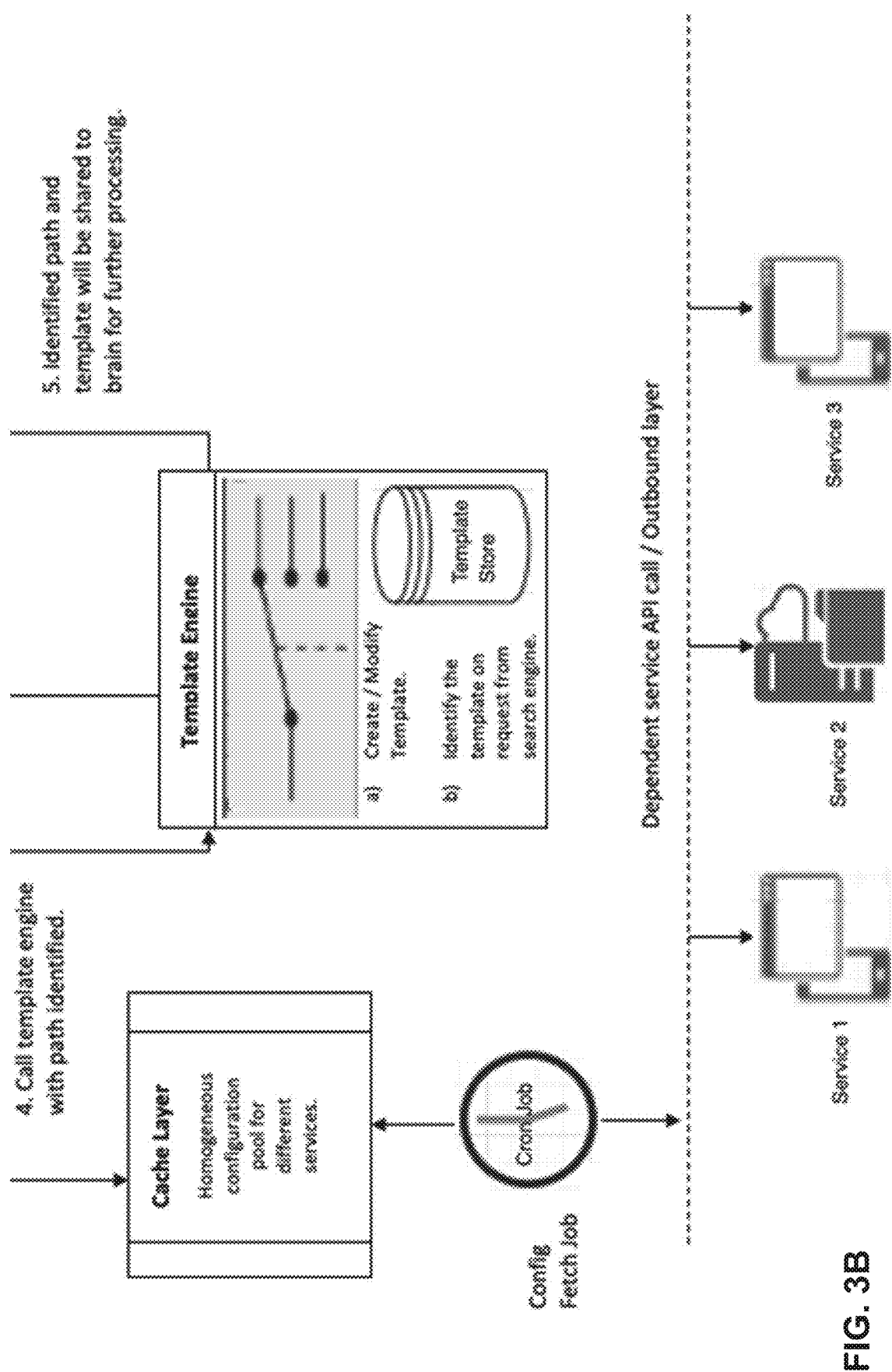
Figure 4:
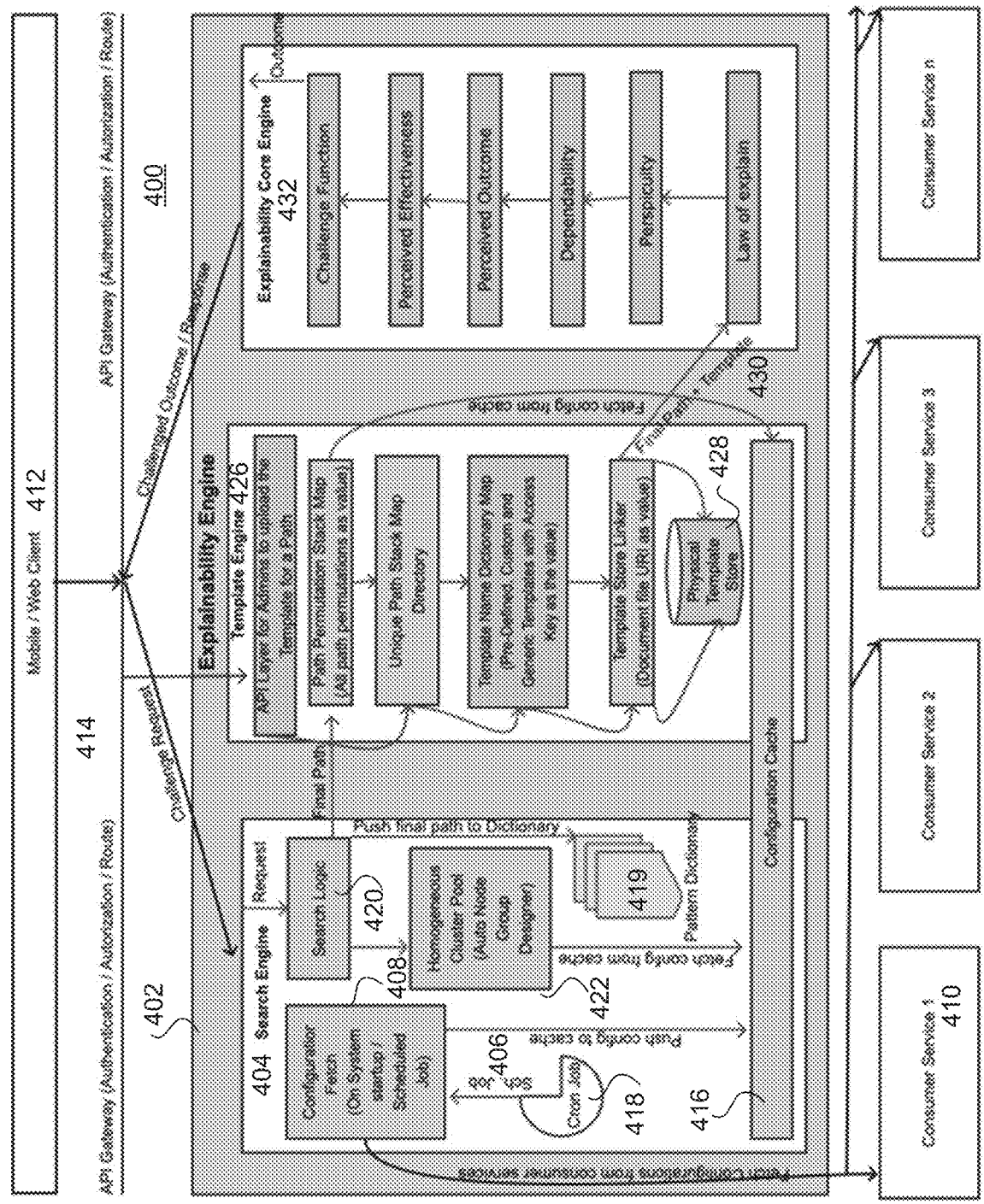
FIG. 4 shows an embodiment of an explanation framework architecture according to an example.

FIGS. 3A-3B show a flow diagram 300 of events occurring within this explainability framework. FIG. 4 shows an architecture diagram for an explainability framework 400 according to an exemplary embodiment.

As shown in FIG. 4, the explainability framework comprises an explainability engine 402 including a search engine 404. Initially, prior to the receipt of any explanation request and in response to a scheduled job 406, an automatic change fetcher 408 fetches configurations from a plurality of dependent consumer services 410 that are in communication with the explanation framework.

The dependent services (Service 1, Service 2, ... ) may be part of the Application of whose output the actor is seeking further explanation. For a travel management application (e.g., CONCUR) example services could include:

tax service,
country policy service, and
an expense calculation service.

FIG. 4 shows the mobile or web client 412. This mobile or web client provides the user interface of the application that contains and calls the various consumer services 1 . . . n.

FIG. 4 further shows the API Layer 414. The consumer services can call the exposed API to fetch the explanation note for a particular solution/transaction. The explanation note is what is contained in the respective template that is then populated.

The Representational State Transfer (REST) layer will be exposed and will perform the search in the configuration cache layer 416 using various search procedures. This searching serves to determine the relevant explanation for each request.

The automatic change fetcher is responsible for fetching the data from external services/consumer services. Here, changes in the configuration data are fetched. The configuration data contain actual values to either be put into the template of the explanation note (e.g., tax amounts, expense amounts, etc.) or are data that provide definitions.

This fetch of configuration changes will be controlled by a Cron Job Scheduler 418 where timer defined/set by the consumer. Main components of the Data feeder engine are:
1. External API Directory: The API directory will hold the API URL's to be invoked during the Cron job execution. This will be added and maintained by the consumers.
2. Data to Node: The data fetched from each service needs to be classified and formed to the acceptable formats at our side. The final data needs to be pushed to the cache once after the formatting and filtering of data is completed.
3. Sensitive data filter: The Sensitive data will be filtered out from the explanation notes, the filter is designed to handle the same.
4. Cron Job layer: A dedicated Cron job will be running to schedule the data fetch job from the parent service.

An asynchronous Publication/Subscription model can be used to push the latest changes to the Explainability framework. If the change needs to be rapidly pushed to the cache layer, a same exposed API can be leveraged for this purpose.

Figure 5:
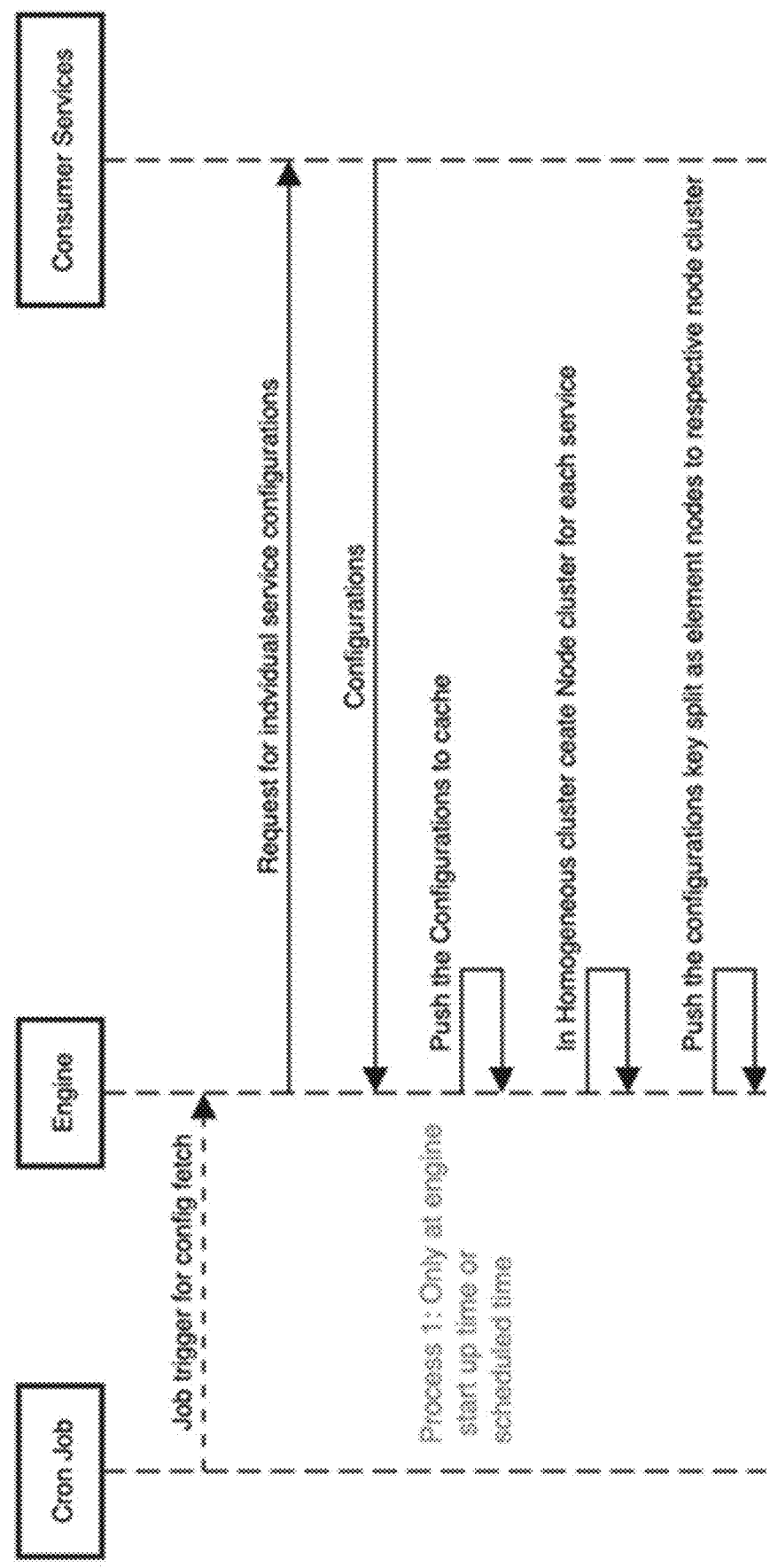
FIG. 5 shows a simplified sequence diagram illustrating initial operation of a search engine according to an example.

FIG. 5 shows a simplified sequence diagram illustrating this initial operation of a search engine according to an example. In particular, the framework is designed in such a way that when a legal configuration/record change occurs (e.g., a change in the tax code is made), the system can periodically fetch those changes from the parent service.

Figure 6:
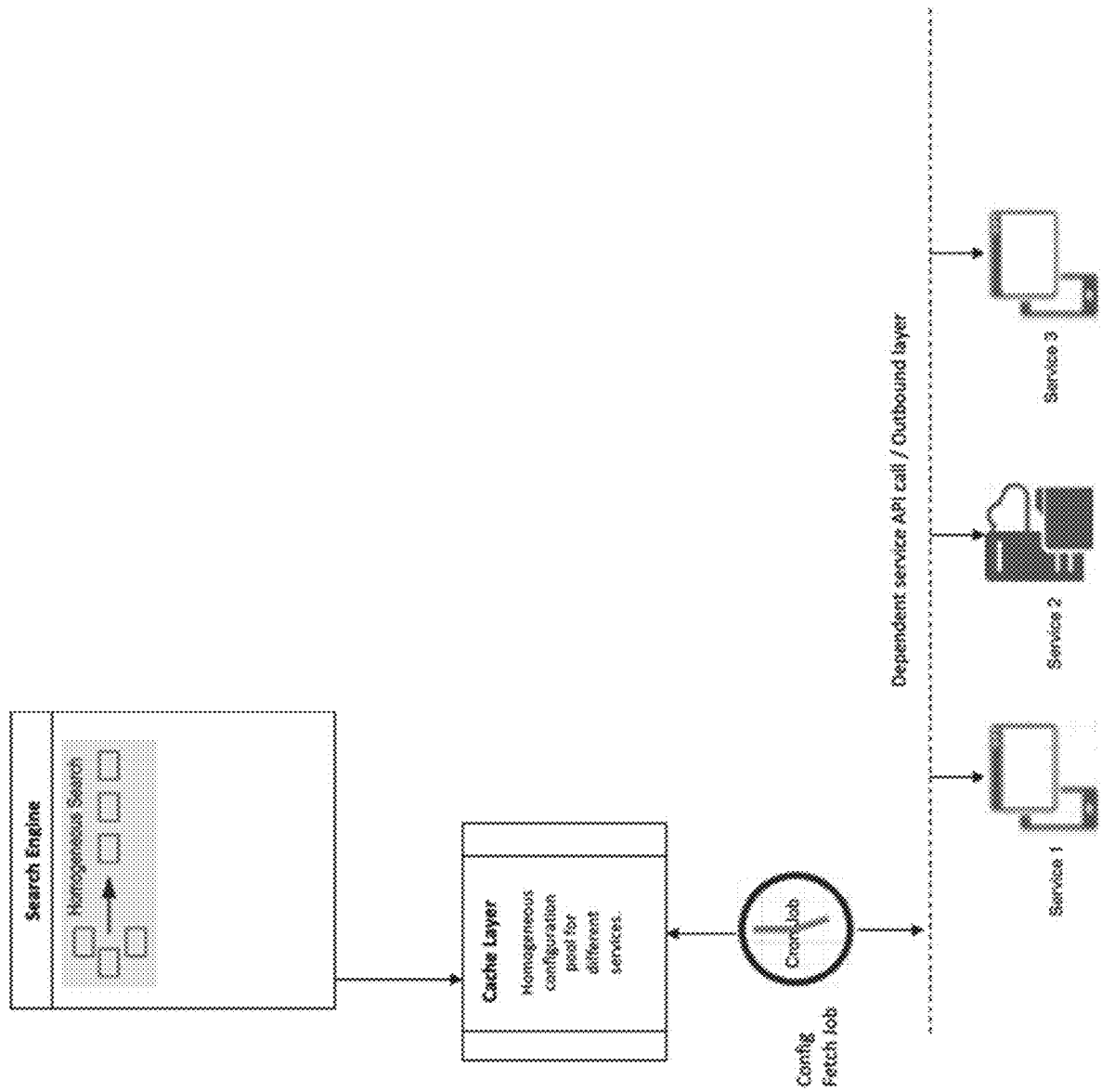
FIG. 6 shows an excerpt of the flow diagram of FIGS. 3A-B, illustrating initial operation of the search engine.

FIG. 6 shows an excerpt of the flow diagram of FIGS. 3A-B, illustrating initial operation of a cache layer. Legal records exposed by the consumer service will be cached in a dedicated service level cache cluster. These cache clusters can be created or modified by the consumer services via another API. As the cache is cluster specific, the cache can be flushed and filled out with service specific data by respective services.

Figure 9:
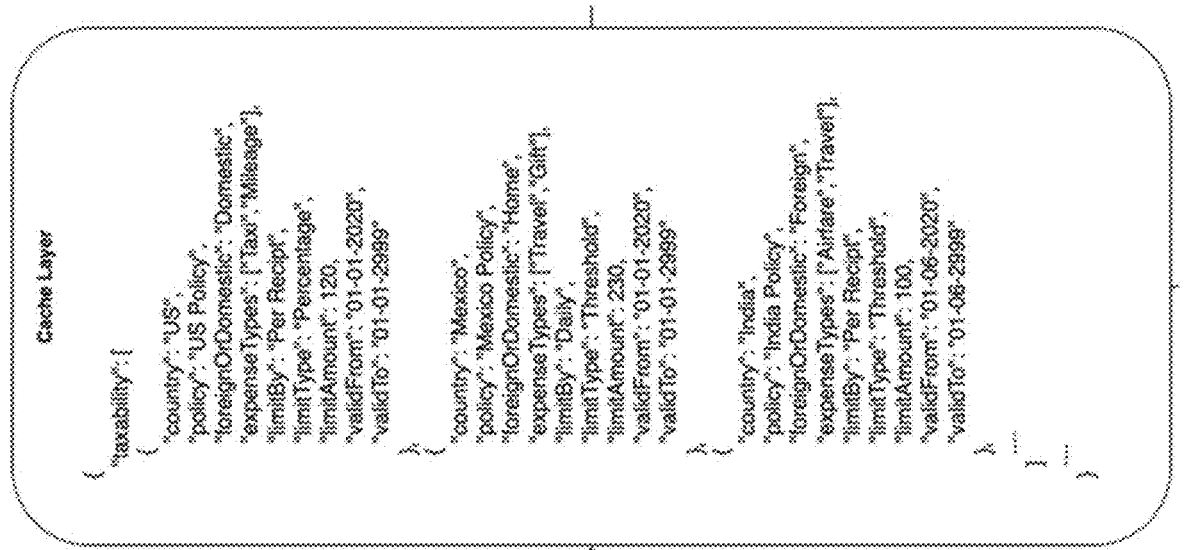
FIG. 9 shows a homogenous cluster as stored in a cache.
Figure 8:
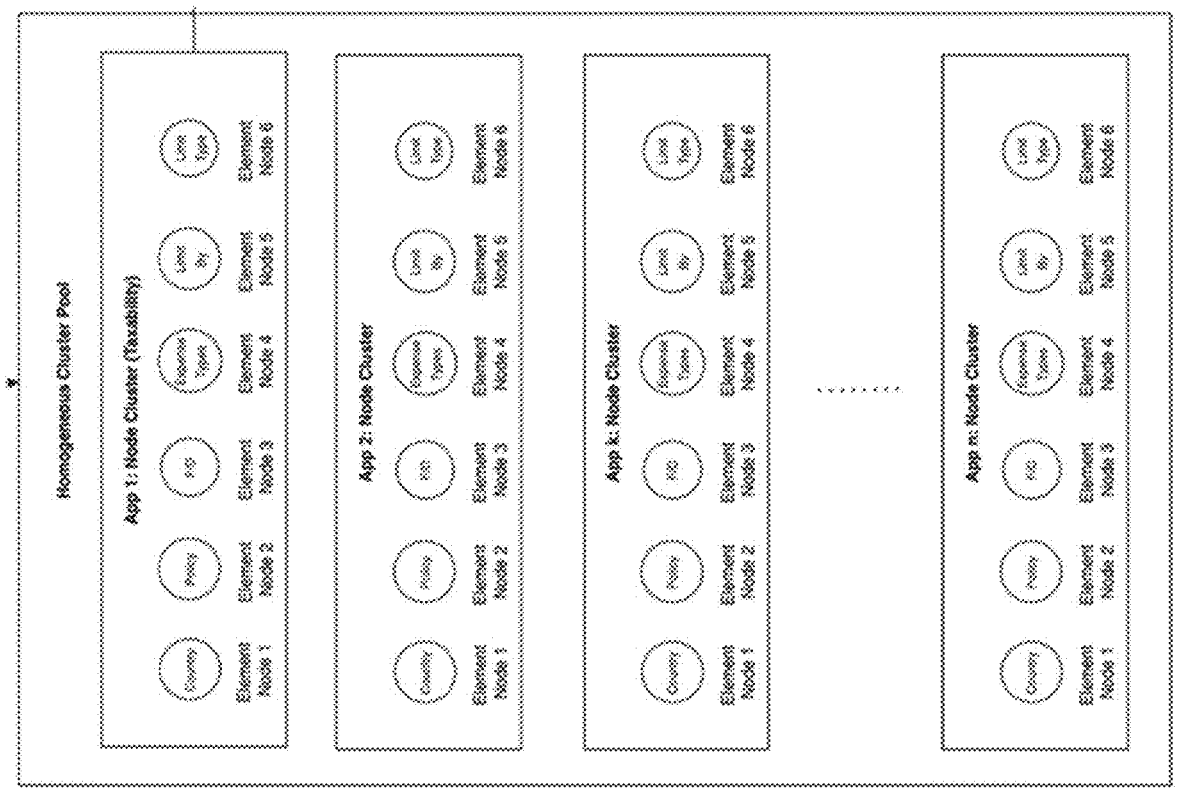
FIG. 8 shows a homogenous cluster pool according to the example.

FIG. 8 shows an example of a homogeneous cluster pool. This cluster pool has a same order of configuration data for each application (the dependent services). The node number equals the ranking of the node. FIG. 9 shows an example of a homogeneous cluster as stored in the configuration cache layer.

Figure 15:
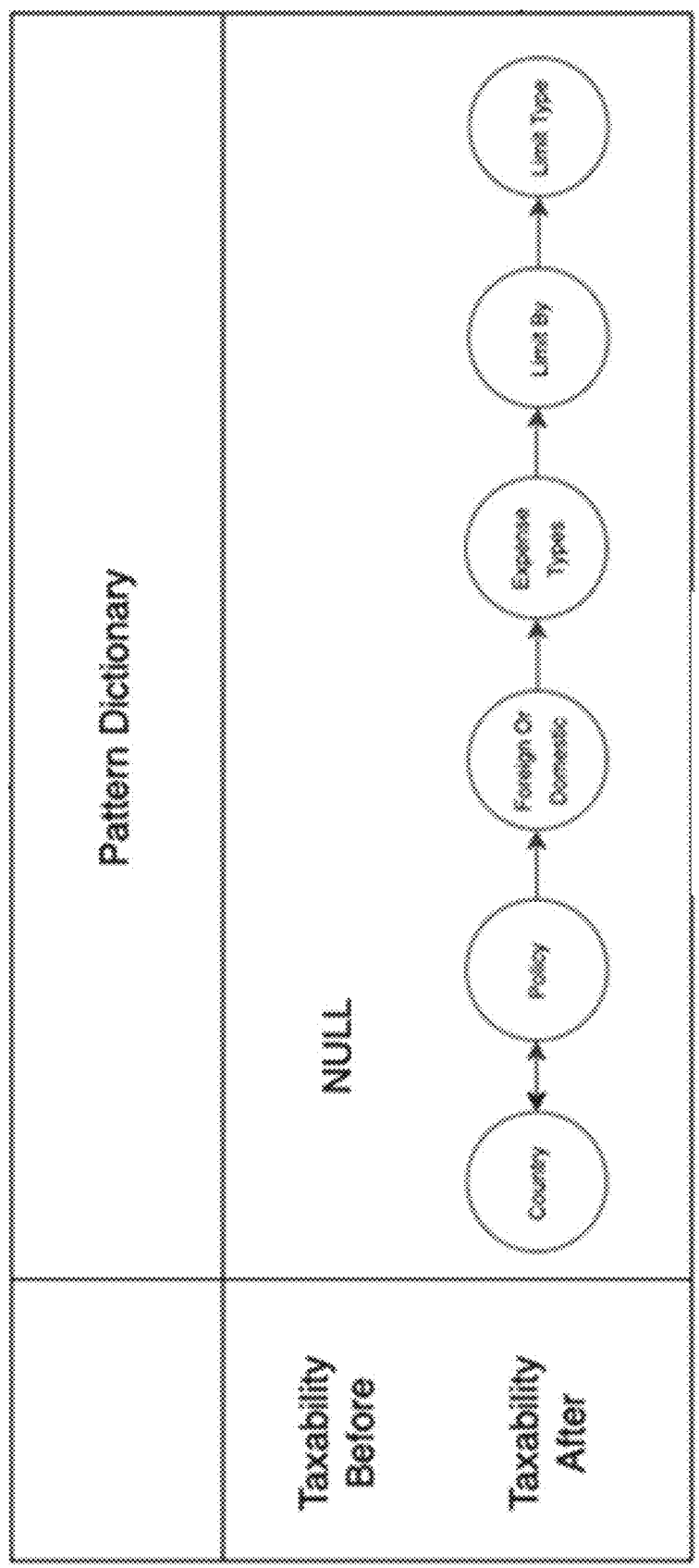
FIG. 15 shows an example of a pattern dictionary.

FIG. 15 shows an example of configuration data that is formed into a path (before and after a change). This configuration data may be present in a pattern dictionary 419.

Figure 10:
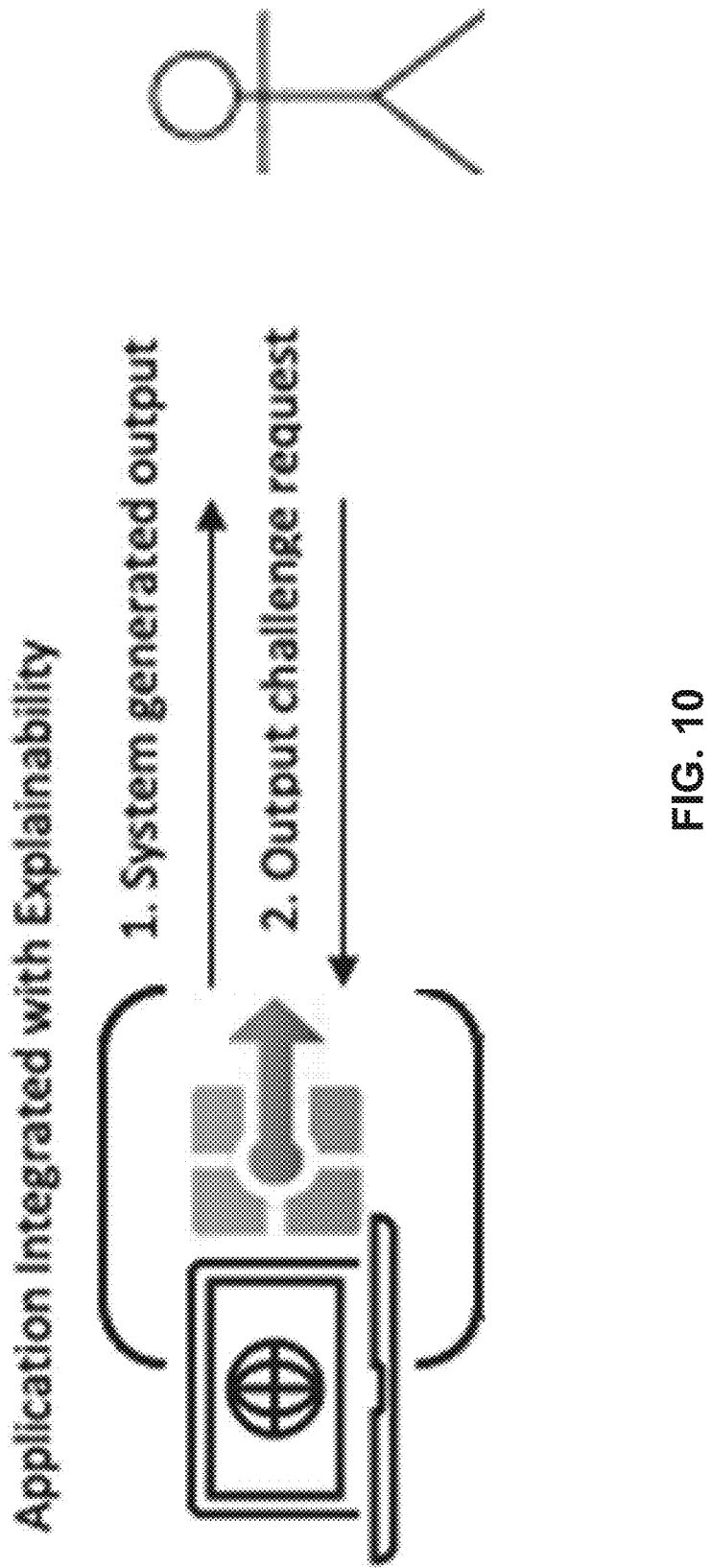
FIG. 10 shows an excerpt of the flow diagram of FIGS. 3A-B, illustrating initial user interaction with the explainability framework.

Once the configurations are stored in the cache, the explainability platform is ready to receive a request for explanation from the user. FIG. 10 shows an excerpt of the flow diagram of FIGS. 3A-B, illustrating initial user interaction with the explainability framework.

FIG. 11 shows a screenshot of an exemplary system generated output for which explanation is to be requested. Here, CONCUR provides taxability splits as shown in the screen. However, one or more of the following issues may be unknown to a user:
why these amounts were taxed for each expense;
the percentage applied for taxation,
the threshold limit, etc.

Figure 12:
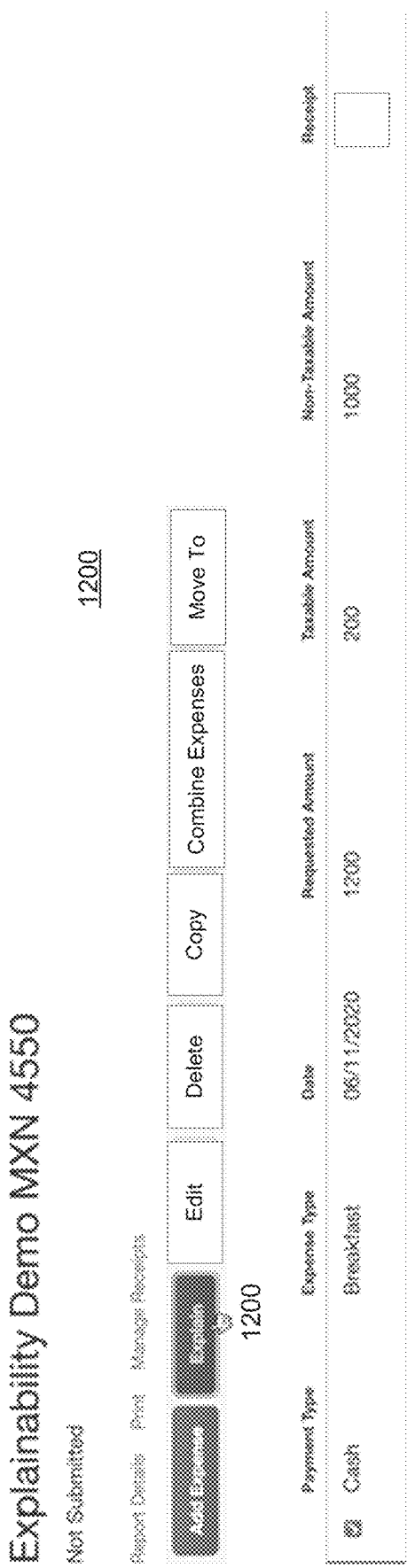
FIG. 12 shows an exemplary screenshot of an output challenge request.

Accordingly, embodiments provide an explainability framework for providing such additional information. FIG. 12 shows an exemplary screenshot of an output challenge request to the framework.

In particular, an Explain button 1200 is introduced, which can be clicked by end users. Doing so will result in re-tracing the calculation with results being explained in detail.

Once clicked, the Explain button will provide an explanation by populating a selected template with results of a homogenous search. Here, the explanation applies to a specific expense item selected by the user.

Figure 13:
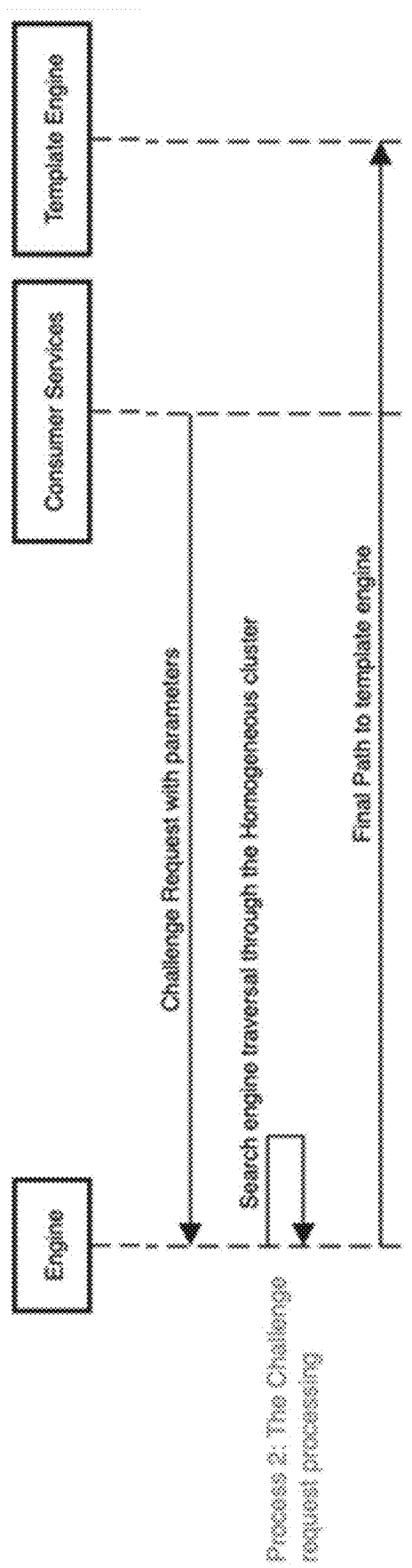
FIG. 13 shows a simplified sequence diagram illustrating operation of a search engine in response to an output challenge request according to an example.
Figure 14:
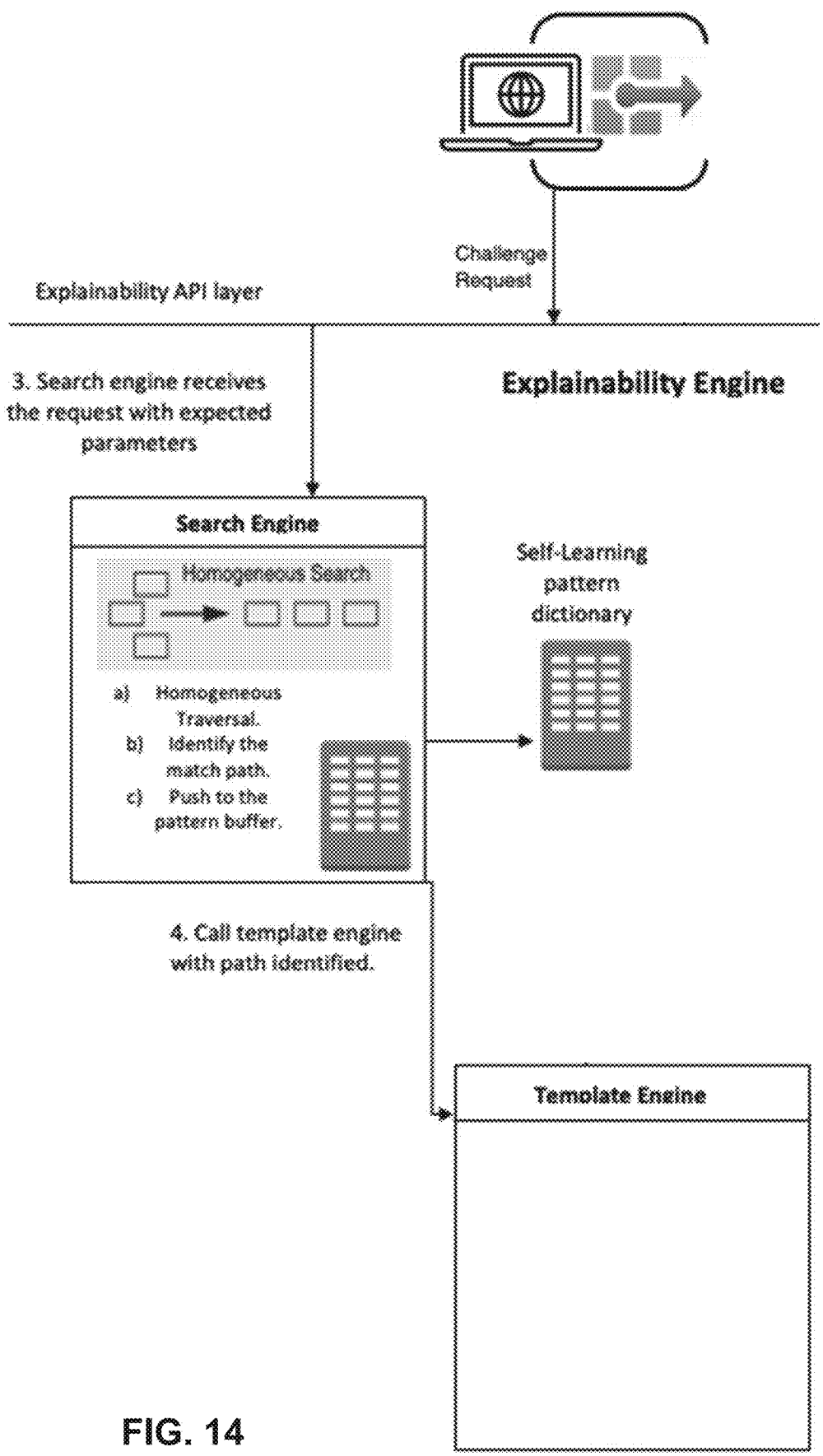
FIG. 14 shows an excerpt of the flow diagram of FIGS. 3A-B, illustrating operation of the search engine in response to the challenge request.

FIG. 13 shows a simplified sequence diagram illustrating operation of a search engine in response to an output challenge request according to an example. FIG. 14 shows an excerpt of the flow diagram of FIGS. 3A-B, illustrating operation of the search engine in response to the challenge request.

The search engine is the part of the explainability framework where keywords shared by the consumer services are formulated and searched across the dedicated cache clusters. The nodes traversed by this searching forms a path, that is then used to populate the template to form the explanation notes.

Keywords comprise search keys for searching inside the configuration data stored in the configuration cache layer. Keywords are provided when a user triggers a challenge to a result. For example, a user may want to know why the daily allowance for India differs from a previous year (2019). The search key would then include elements such as "India", "daily", "2019", "2020"). FIG. 25 provides an example screenshot of an explanation that could result from such elements.

The search engine includes a homogeneous search brain 420 where the search mechanism resides. The homogeneous search brain groups similar kinds of data, and searches on those data in a precise and fast model.

Figure 7:
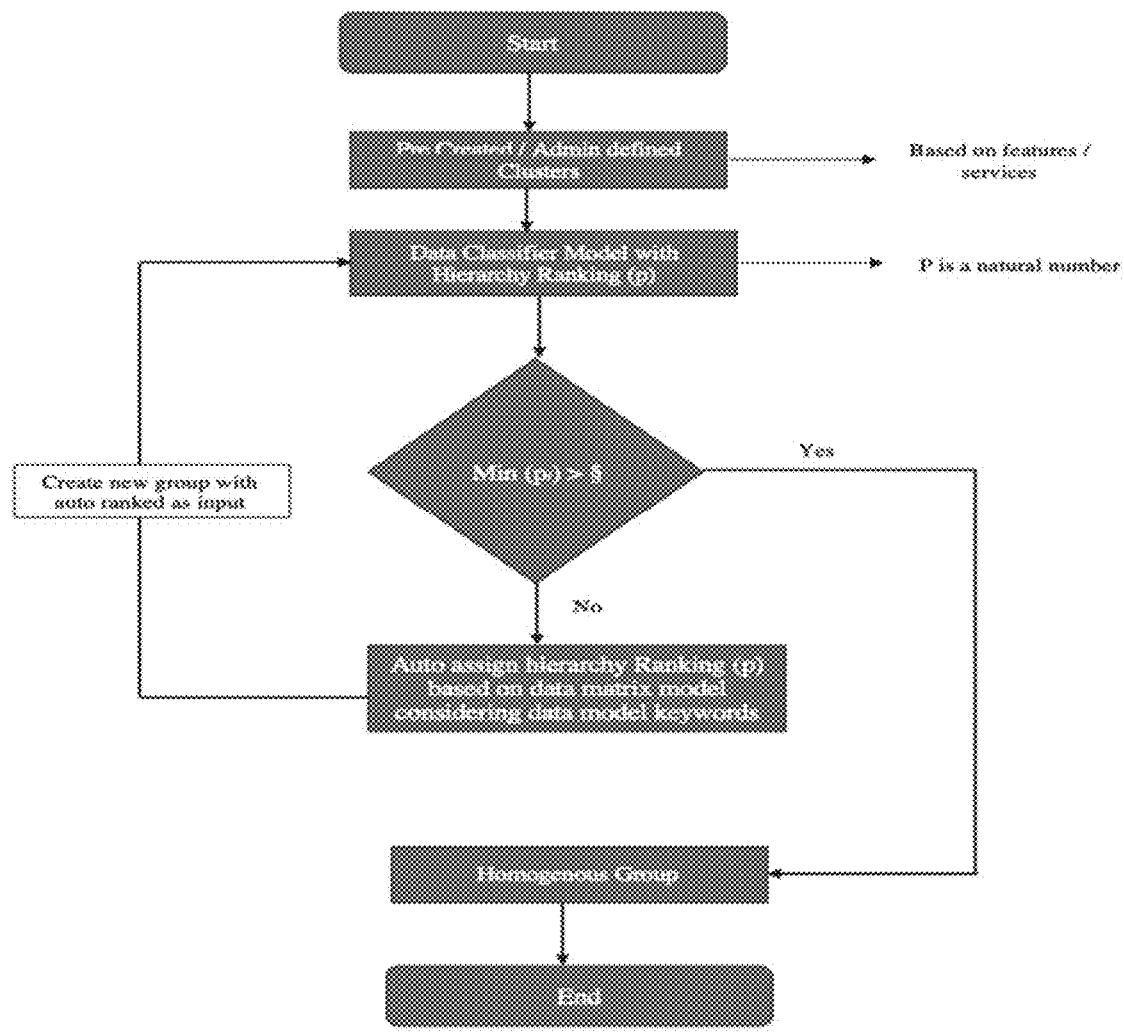
FIG. 7 is a flow diagram illustrating operation of an auto node group designer according to the example.

Grouping similar kind of objects in one group, and searching in the groups is homogenous search. The Auto Node Group Designer 422 is responsible for grouping. FIG. 7 is a flow diagram illustrating operation of an auto node group designer according to the example.

Objects are the configuration data. The grouping of the configuration data has occurred upfront when new/updated configuration data is fetched. So, when the user challenges an outcome, the search can commence.

The search brain traverses through the groups of similar kinds of data, and jumps to the neighbor node based on the ranking created during data formation in the cache. The search key traversal is performed with weighing the neighboring node based on a natural ranking in the homogenous group. Each data element will be ranked with a natural number, and will be grouped according to the ranking order.

The search keys will be passed to the grouped data model, also referred to herein as a homogenous cluster pool. Again, grouping occurs upfront, after fetching new/updated configuration data. By contrast, the searching is performed each time a challenge to an outcome is received from the user.

Search results will be matched to get the path of the nodes. The node value path is the outcome of the search. As explained further below, contents of the node value path are furnished to select and then populate the explanation note template with actual values (e.g., tax value, time thresholds).

Figure 16A:
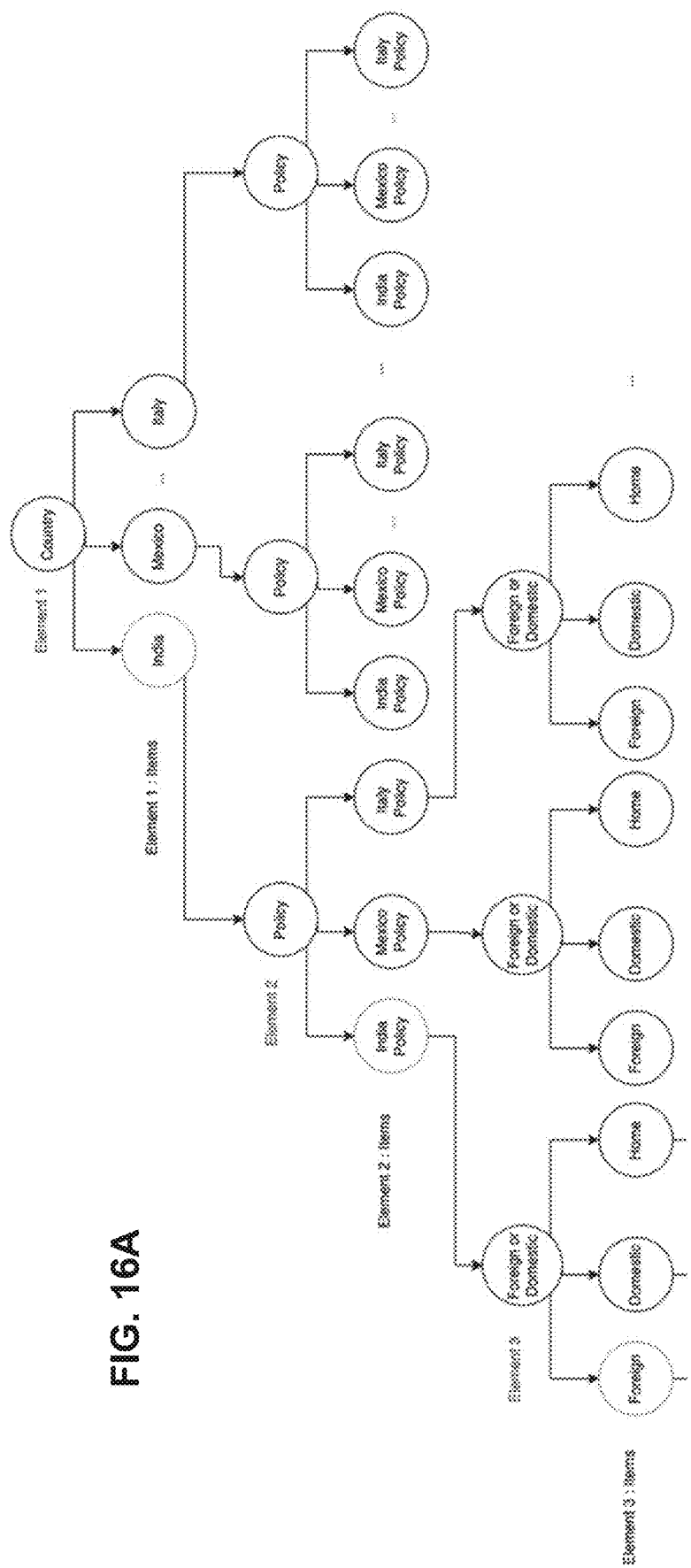
FIGS. 16A-B show an example of traversal by the search engine.
Figure 17:
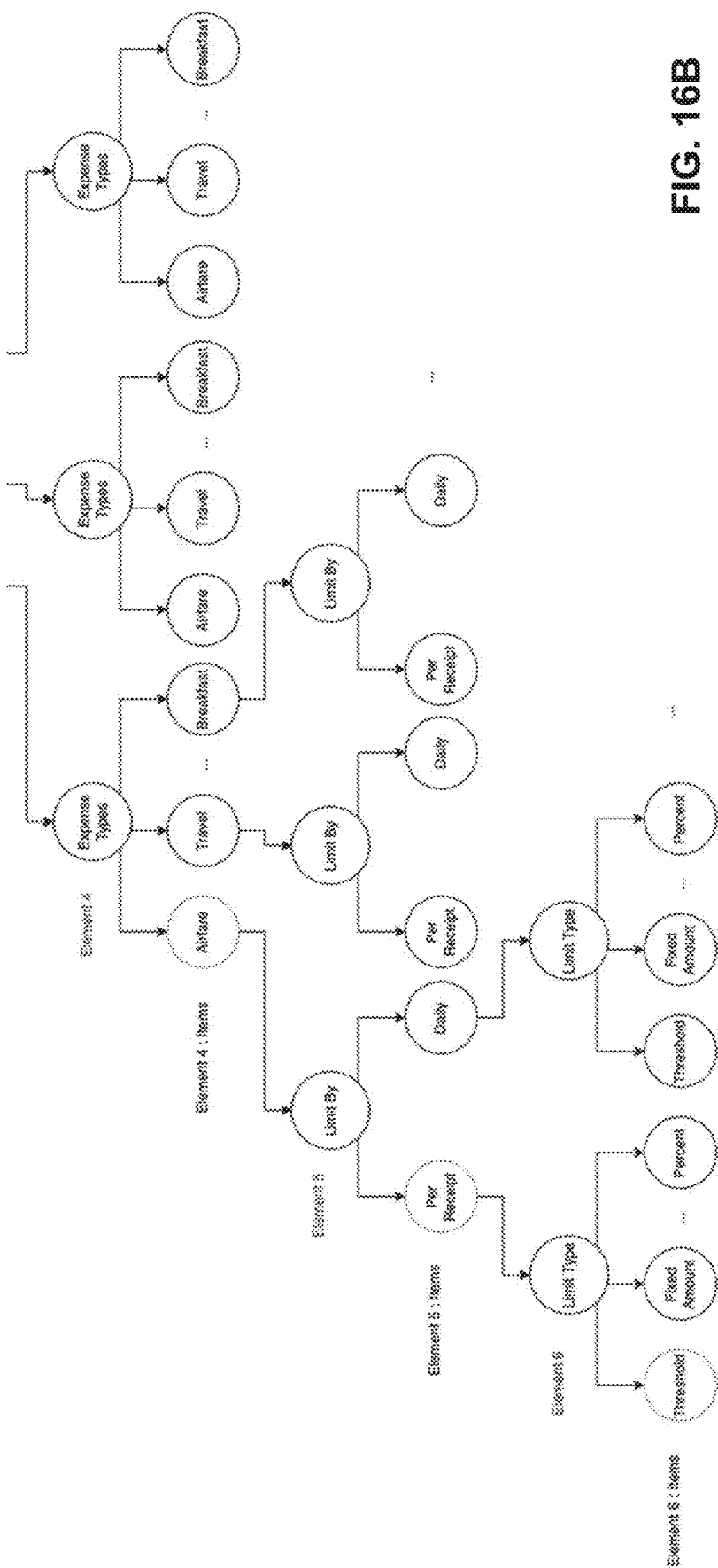
FIG. 17 shows an example of a path.
Figure 16B:
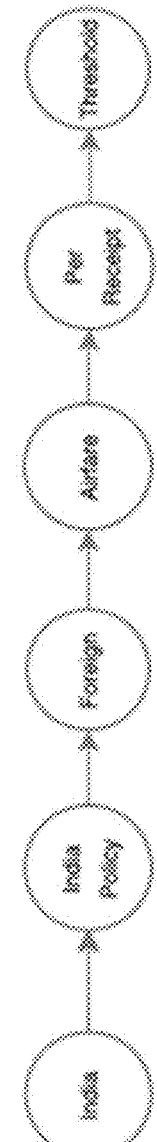

FIGS. 16A-B show an example of traversal by the search engine. FIG. 17 shows an example of a path.

In traversing the homogenous nodes, the search key will be passed to the group and traverse to each branch to find the exact match. The match node id will be kept, and once every search key is finished the full traversed path will be picked as the explainability confidence data. As explained below, together with the template that explainability confidence data is ultimately input to the challenge portion of the explainability framework.

The probable/confidence path to the template integrator is now discussed. Once the final path 424 is determined by the searching, that path needs to be passed to the template engine 426. There, the predefined templates will be fetched out from the template store 428, and the results of the final path will be added to (populate) the template content.

The template engine is also exposed via a REST API. This allows the users to be free to add, modify and delete the templates.

Template fetch logic is now described. A unique name will be assigned to each template created by the users.

The unique name will follow the same formula as how the data is getting searched for the path. At one point, the final path which is getting picked for each case is the final unique ID. The same logic will be applied to each template name also.

Template localization is now described. Each template will have a localized component available, and they will be kept separately. Based on the user requested language the localization templates will be picked up.

Details regarding the directory and template store are now provided. The directory and template store will be holding the templates created by the users. This can be a NOSQL approach referencing a document-based database.

The templates and localization elements will fall into this directory. No Configurations/Legal records will be saved in this template store.

Figure 18:
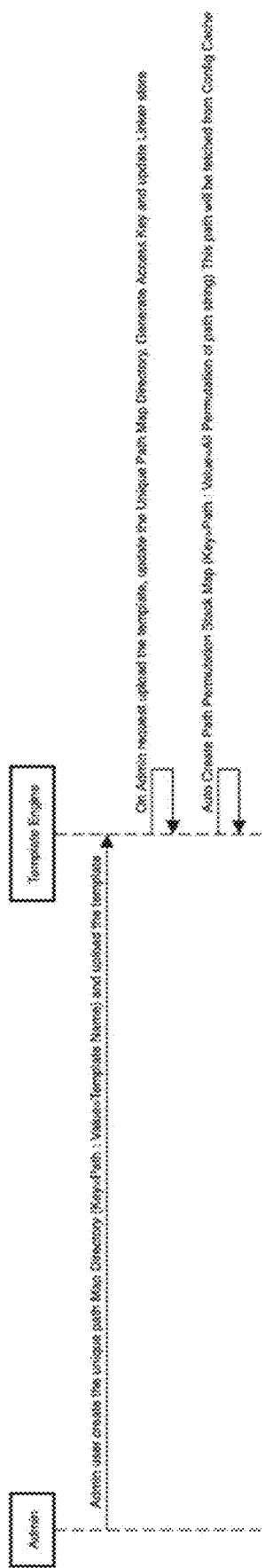
FIG. 18 shows a simplified sequence diagram illustrating initial operation of a template engine according to an example.

FIG. 18 is a simplified flow diagram showing the initial interaction between an administrator user and the template engine. Here, the administrator user creates a new template including an explanation note, and assigns a unique path to that template. template+path are stored in the physical template store. Path permutations are then automatically created—i.e., different orders of the same configuration data.

Figure 19:
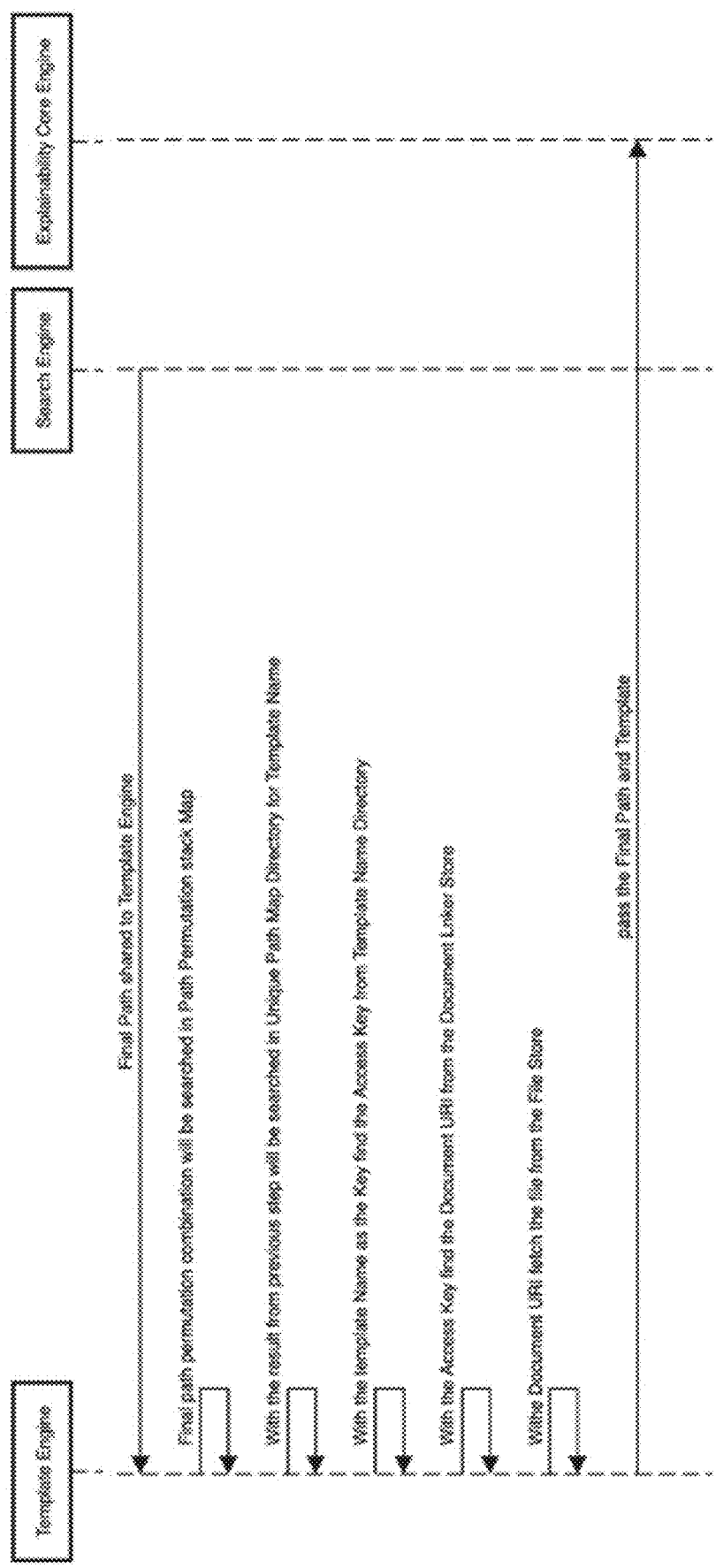
FIG. 19 shows a simplified sequence diagram illustrating operation of the template engine in response to a received path.
Figure 20:
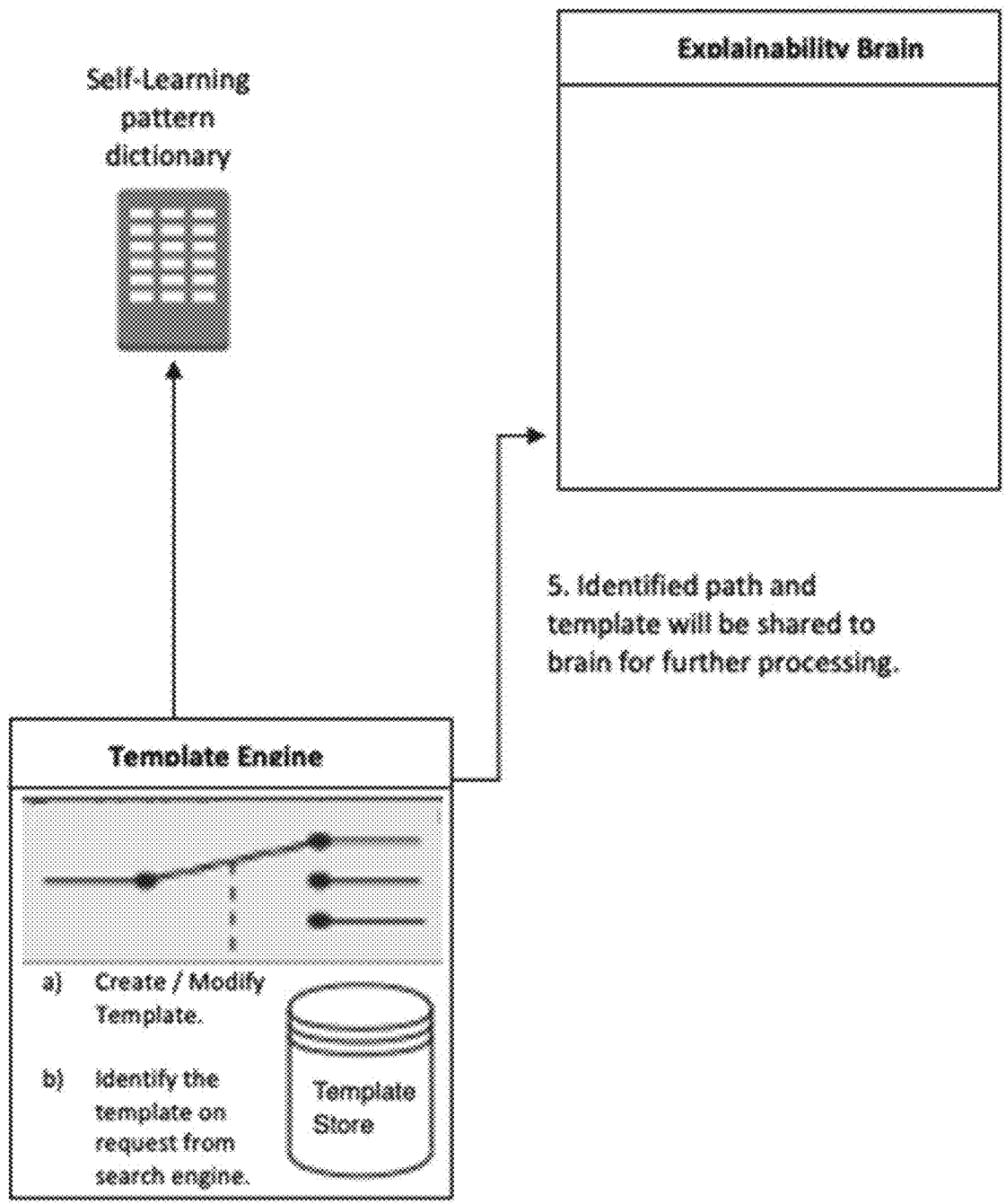
FIG. 20 shows an excerpt of the flow diagram of FIGS. 3A-B, illustrating operation of the template engine in response to the path received.
Figure 21A:
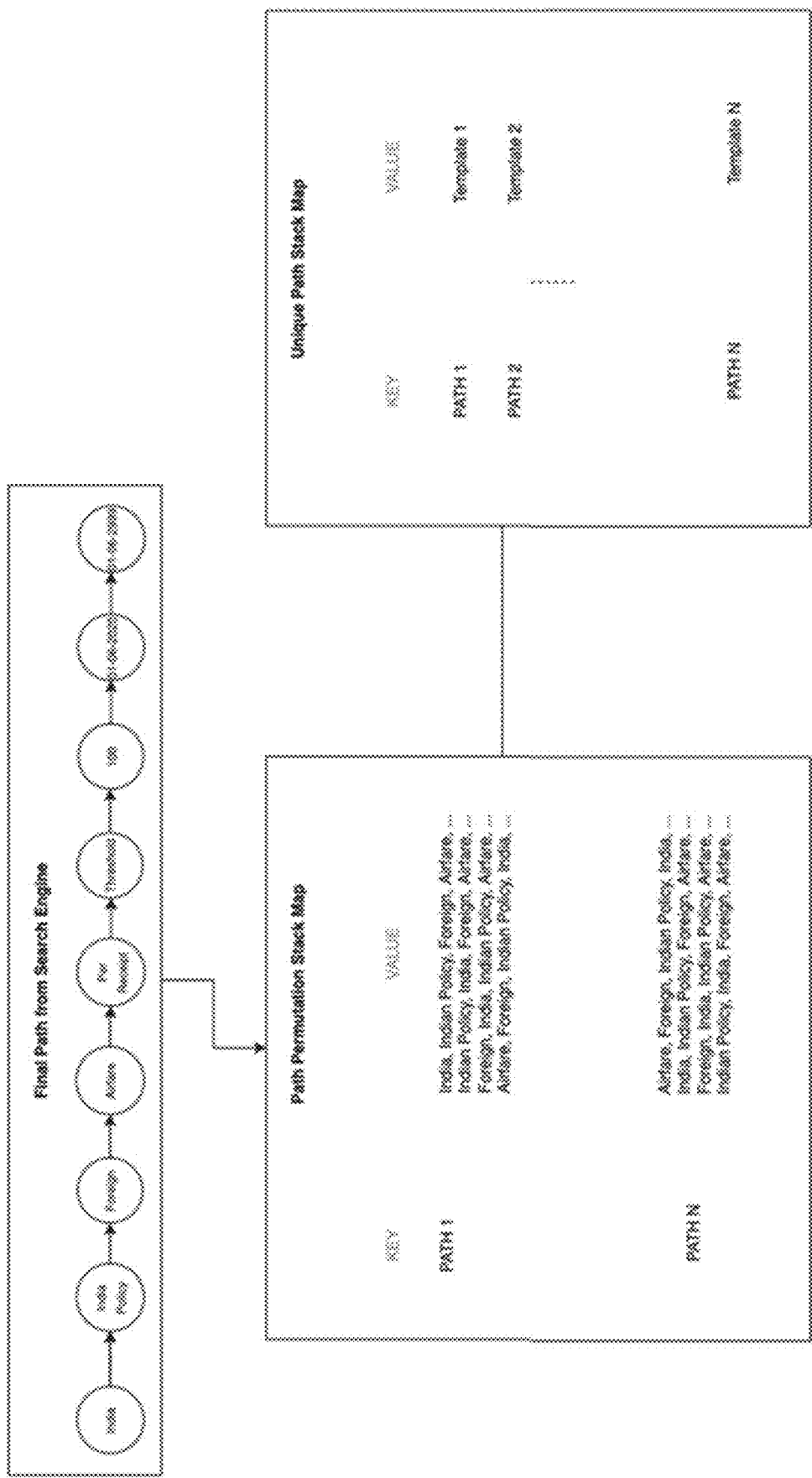
FIGS. 21A-B show a simplified view of a template according to an example.
Figure 21B:
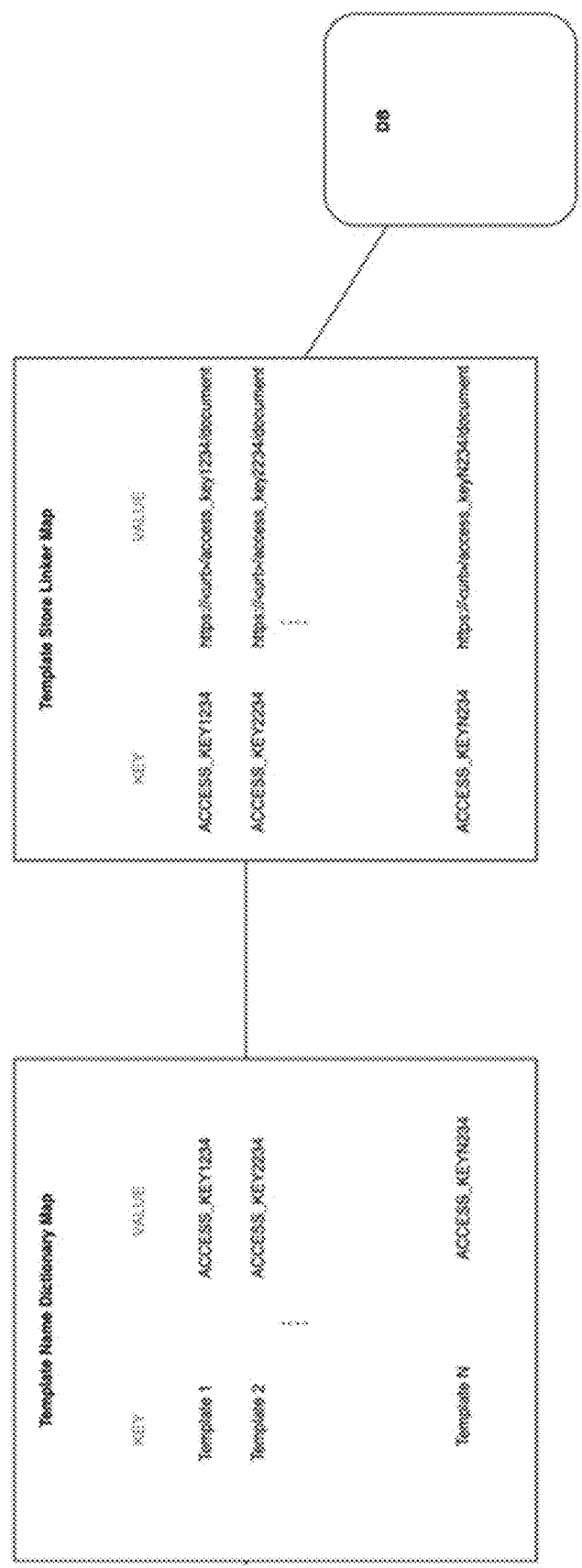

FIG. 19 is a simplified flow diagram showing the subsequent interaction between the template engine and the search engine. FIG. 20 shows an excerpt of the flow diagram of FIGS. 3A-B, illustrating operation of the template engine in response to the path received. FIGS. 21A-B show details of a template according to the example.

Figure 22:
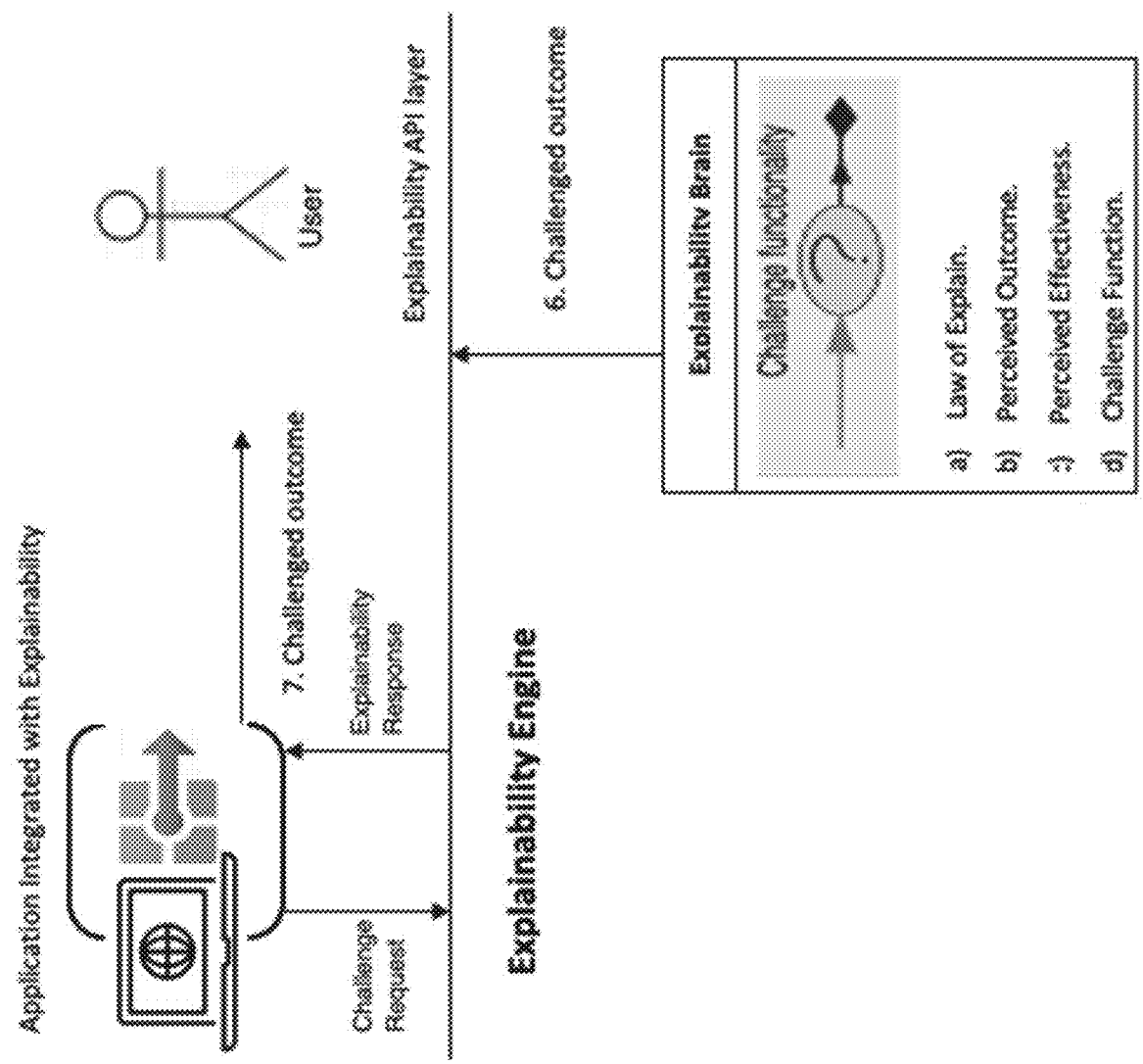
FIG. 22 shows an excerpt of the flow diagram of FIGS. 3A-B, illustrating operation of the explainability core engine in response to the received path and template.

Once the template 430 has been populated, it and the final path are communicated as an outcome to be challenged, to an explainability core engine 432. FIG. 22 shows an excerpt of the flow diagram of FIGS. 3A-B, illustrating operation of the explainability core engine in response to the received path and template.

Figure 23:
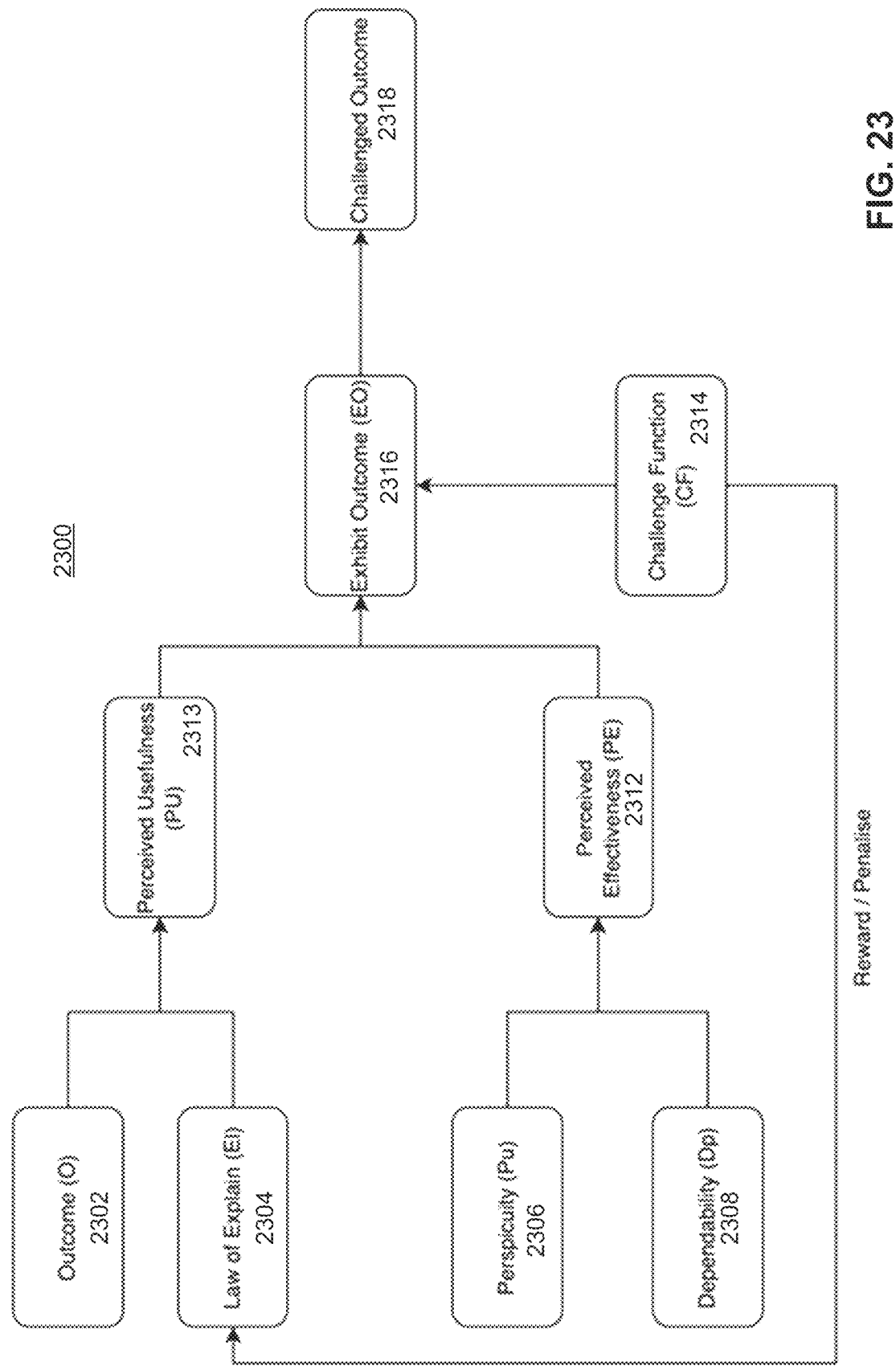
FIG. 23 shows details of operation of the explainability core engine according to the example.

FIG. 23 is a simplified view illustrating the underlying logic 2300 of the explanation framework according to this example. Individual elements of FIG. 23 are as follows:

Outcome—O 2302=final path+template
Law of explain—El 2304
Perspicuity—Pu 2306
Dependability—Dp 2308
Perceived Outcome—Po 2310
Perceived Effectiveness—Pe 2312
Perceived Usefulness—Pu 2313
Challenge Function—CF 2314
Exhibit Outcome—Eo 2316
Challenged Outcome—Co 2318

The outcome (O) comprises the path and the selected template. The outcome is modelled as a Poisson distribution. This helps in understanding outcomes which are essentially independent variables occurring in a given time interval.

The Law of explain (El) is reward-based reinforcement model. A reward is given if the user does not challenge the outcome via the CF explained below.

A value of CF being essentially zero, indicates the outcome is not challenged by the user. Hence the outcome (O) and law of explain (El) is understood to be correct, resulting in a reward for this approach.

A positive value of CF results in the user marking the outcome as "Suspect". This will result in El being rewarded as well. By contrast, a CF resulting in the user marking the outcome as "Unclear explanation" will result in a penalty for El.

Perceived Usefulness (Pu) is given as:

$$Pu = COV(O, Ed) = (\Sigma(Oi - \text{bar } O)*(Edi - \text{bar } Ed))/n$$

The covariance function provides a measure of the association between O and El. A positive covariance would be the desired outcome, discounting whether is a up or down moving plot.

By contrast, a negative covariance indicates El is not in line with O. This indicates one or more of the following:
Outcome, generated by the compute function or system is incorrect
Law of explain is unable to infer the Outcome, O.
Perceived effectiveness (Pe) is given as:

$$Pe = Dp \cap Pu$$

Perceived effectiveness is an intersection of Dependability and Perspicuity. Perspicuity is a measure of clarity and works on the model of induced defects. An induced defect learnt from a faulty calculation of El historically helps to reinforce a form of confidence that past earnings are adhered to. Dependability is historical correctness.

Exhibit Outcome (Eo) is expressed as:

$$Eo = COR(Po, PE) = (COV(Po, PE))/(\sigma_{PO} * \sigma_{PE})$$

The Exhibit Outcome (Eo) uses a correlation function to infer the degree or strength of the two variables: Perceived outcome (Po) and Perceived Effectiveness (Pe). The expectation of perfect correlation will underline the strength of this construe framework.

Challenged Outcome (Co) is expressed as:

$$Co = CF * Eo.$$

Where CF is a challenge function.

The challenge function's success is derived from a simple geometric distribution function. The outcome of inferencing is either correct or "failed to be proved correct". In case of "failed to be proved correct", the challenge function is invoked by the user.

The challenge function works on probability. Probability of success on each challenge is p then the probability of kth trail is the first success, is given as:

$$P(x=k)=(1-p)_{k\nu l}\cdot=CF.$$

The expected Value and Variance (VAV) is expressed as CF:

$$E(x)=1/p$$

$$VAV(x)=(1-p)/P^2.$$

This is a simple geometric distribution. The number of failures is given as (x−1). This gives a sense of first success: in other words how far the success is from the proposed solution, which is a measure of the "compute function", or "O" which dished out the results.

Figure 24A:
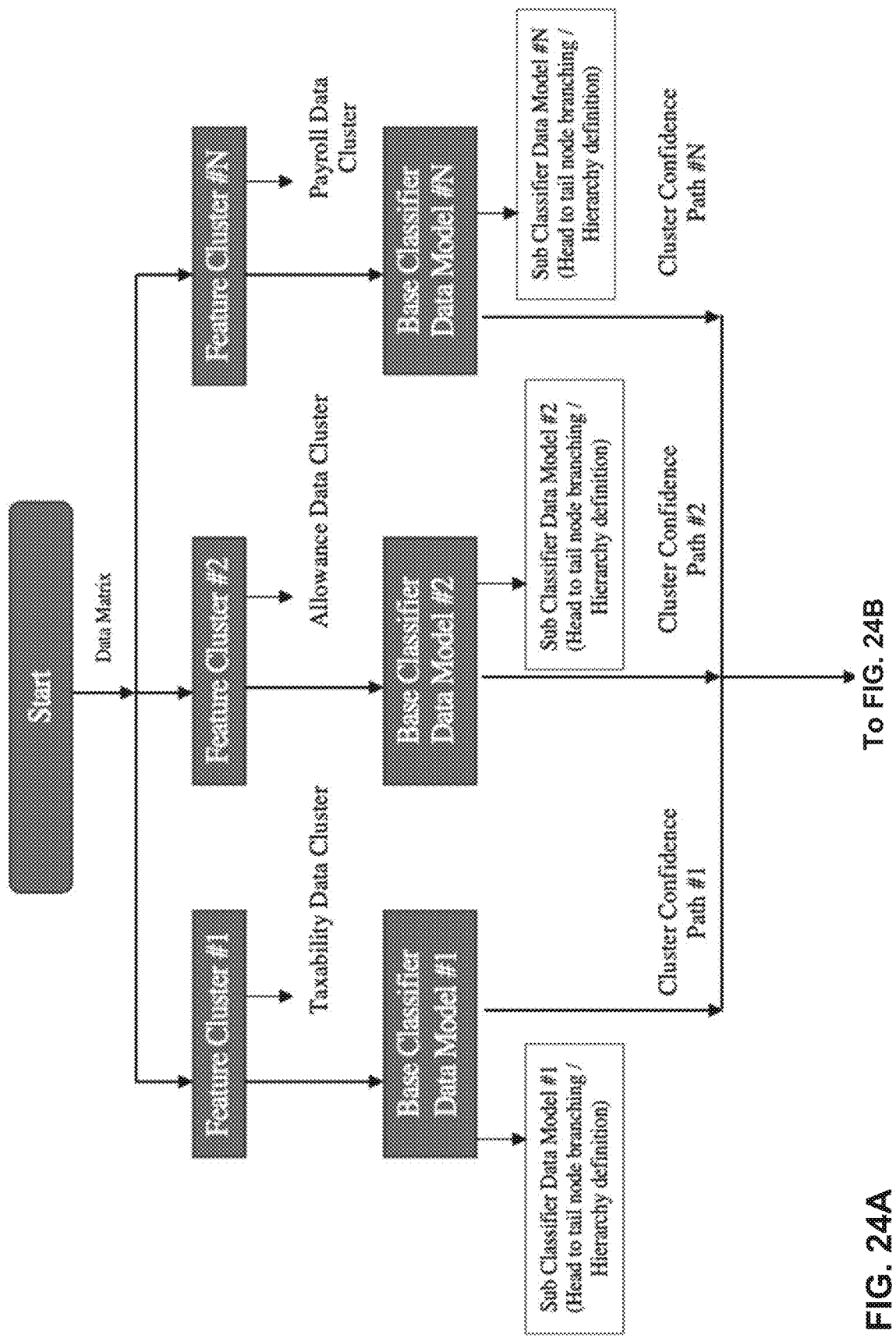
FIGS. 24A-B are simplified flow diagrams illustrating an overall operation of an explainability framework.
Figure 24B:
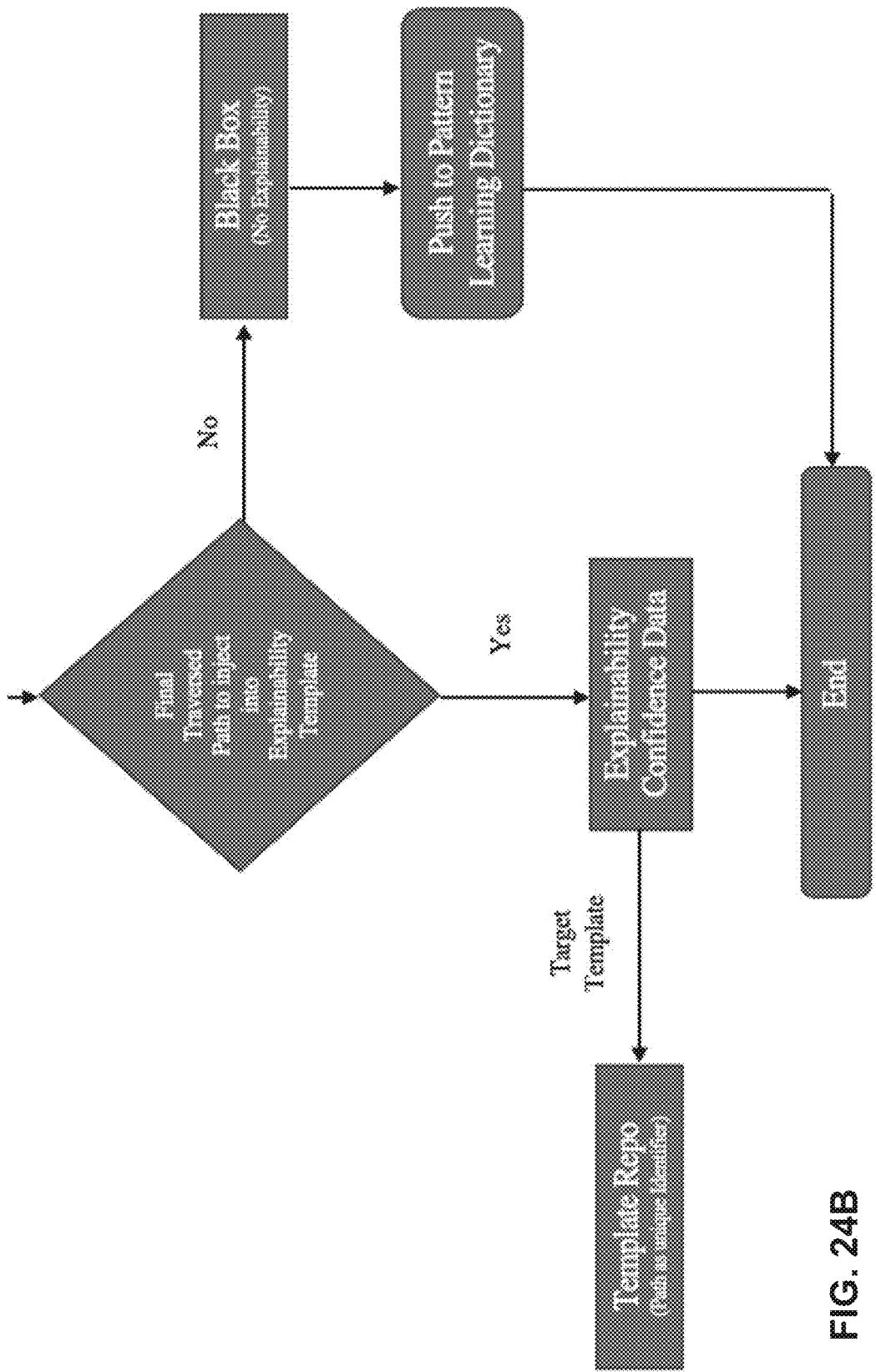

FIGS. 24A-B are simplified flow diagrams illustrating an overall operation of an explainability framework.

FIG. 25 shows a resulting explanation screen produced according to an example. This screen can provide one or more details such as:
the reason for taxation,
which country rule was applied (e.g., India),
the effective year for the taxation (e.g., 2020),
the taxation threshold limit,
the limit is statutory rate or company rate, etc.

While the screenshot of FIG. 25 shows an interface where explanation details are provided for currently existing calculated results, embodiments are not limited to such a scenario. The exemplary framework just described can also apply to services where explanation details are beneficially produced for previously calculated results.

In conclusion, the embodiment according to this example integrates with CONCUR, leveraging that system to provide explanation as to how a particular output is derived. The example can offer a big picture view of an underlying model, and illustrate how features in the data collectively affect the result and each instance.

Embodiments enhance calculation result screens in such a way as to make the end user understand how the results are computed, providing country-specific rule(s) and/or company-specific rule(s) applied to each line item. A detailed description on the calculation can provide details relevant for an end user to better understand the results based upon the compliance rule that an engine considered/applied for the calculation. Providing such explanations and detail to the user can be valuable in building trust and confidence when an organization is placing data models into production.

Returning now to FIG. 1, there the particular embodiment is depicted with the explainability engine as being located outside of the database. However, this is not required.

Rather, alternative embodiments could leverage the processing power of an in-memory database engine (e.g., the in-memory database engine of the HANA in-memory database available from SAP SE), in order to perform various functions as described above.

Figure 26:
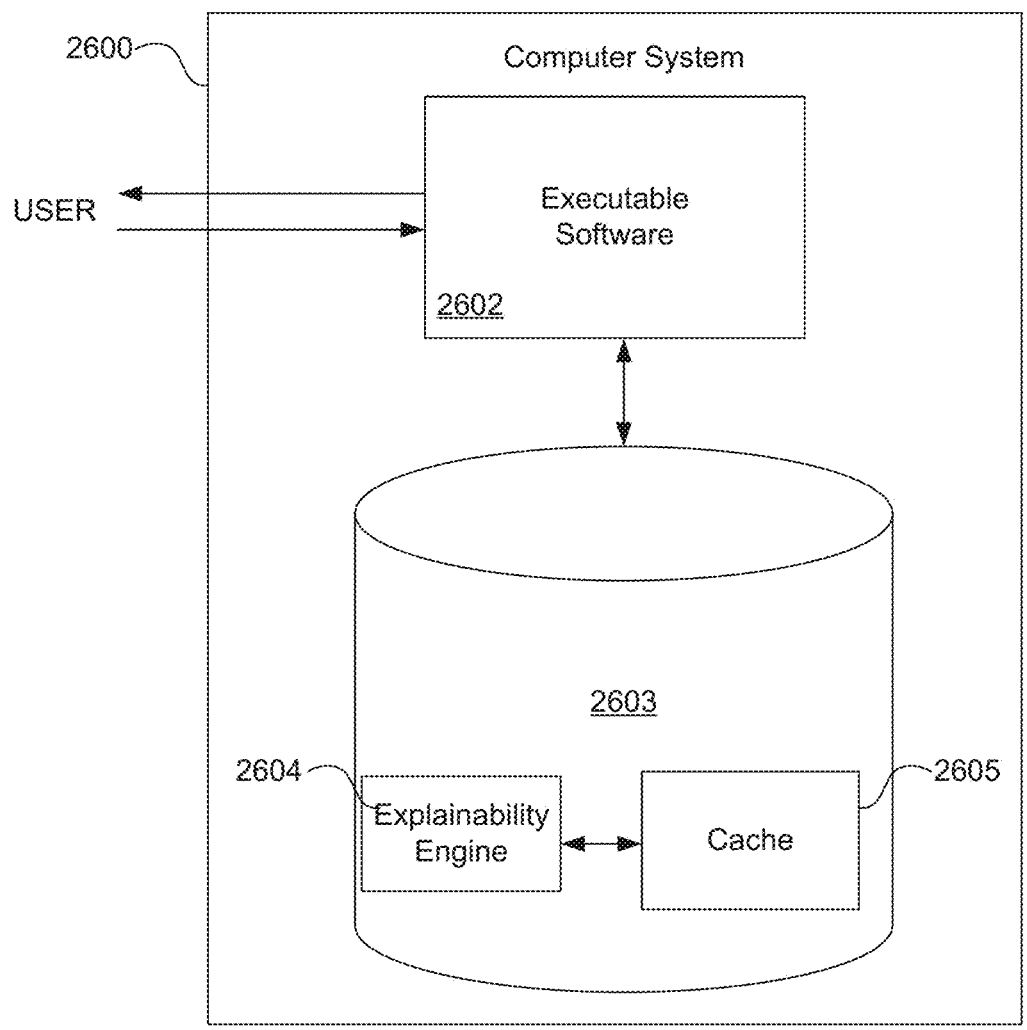
FIG. 26 illustrates hardware of a special purpose computing machine configured for implementing an explanation framework according to an embodiment.

Thus FIG. 26 illustrates hardware of a special purpose computing machine configured to provide explanation according to an embodiment. In particular, computer system 2601 comprises a processor 2602 that is in electronic communication with a non-transitory computer-readable storage medium comprising a database 2603. This computer-readable storage medium has stored thereon code 2605 corresponding to an explainability engine. Code 2604 corresponds to a cache. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1. Computer implemented system and methods comprising: receiving an outcome generated from a calculation result of an analytical application, the outcome comprising,
 a path created by traversal of a homogenous cluster, and
 a template selected using the path and having data inserted from the path; processing the outcome according to a challenge function to create a challenged outcome; and
 communicating the challenged outcome to the analytical application for display with the calculation result.

Example 2. The computer implemented system and method of Example 1 wherein processing the outcome comprises processing the outcome with a first function to create a first intermediate outcome.

Example 3. The computer implemented system and method of Example 2 wherein the first function comprises a covariance function.

Example 4. The computer implemented system and method of Examples 2 or 3 wherein processing with the first function is based upon feedback from the challenge function.

Example 5. The computer implemented system and method of Example 4 wherein the feedback comprises a reward or a penalty.

Example 6. The computer implemented system and method of Examples 2, 3, 4, or 5 wherein processing the outcome comprises:
 processing the first intermediate outcome with a second function to create a second intermediate outcome,
 wherein the second intermediate outcome is processed by the challenge function to create the challenged outcome.

Example 7. The computer implemented system and method of Example 6 wherein the second function comprises a correlation function.

Example 8. The computer implemented system and method of Examples 1, 2, 3, 4, 5, 6, or 7 wherein the challenge function comprises a geometric distribution function.

Example 9. The computer implemented system and method of Examples 1, 2, 3, 4, 5, 6, 7, or 8 wherein the outcome is modelled as a Poisson distribution.

Figure 27:
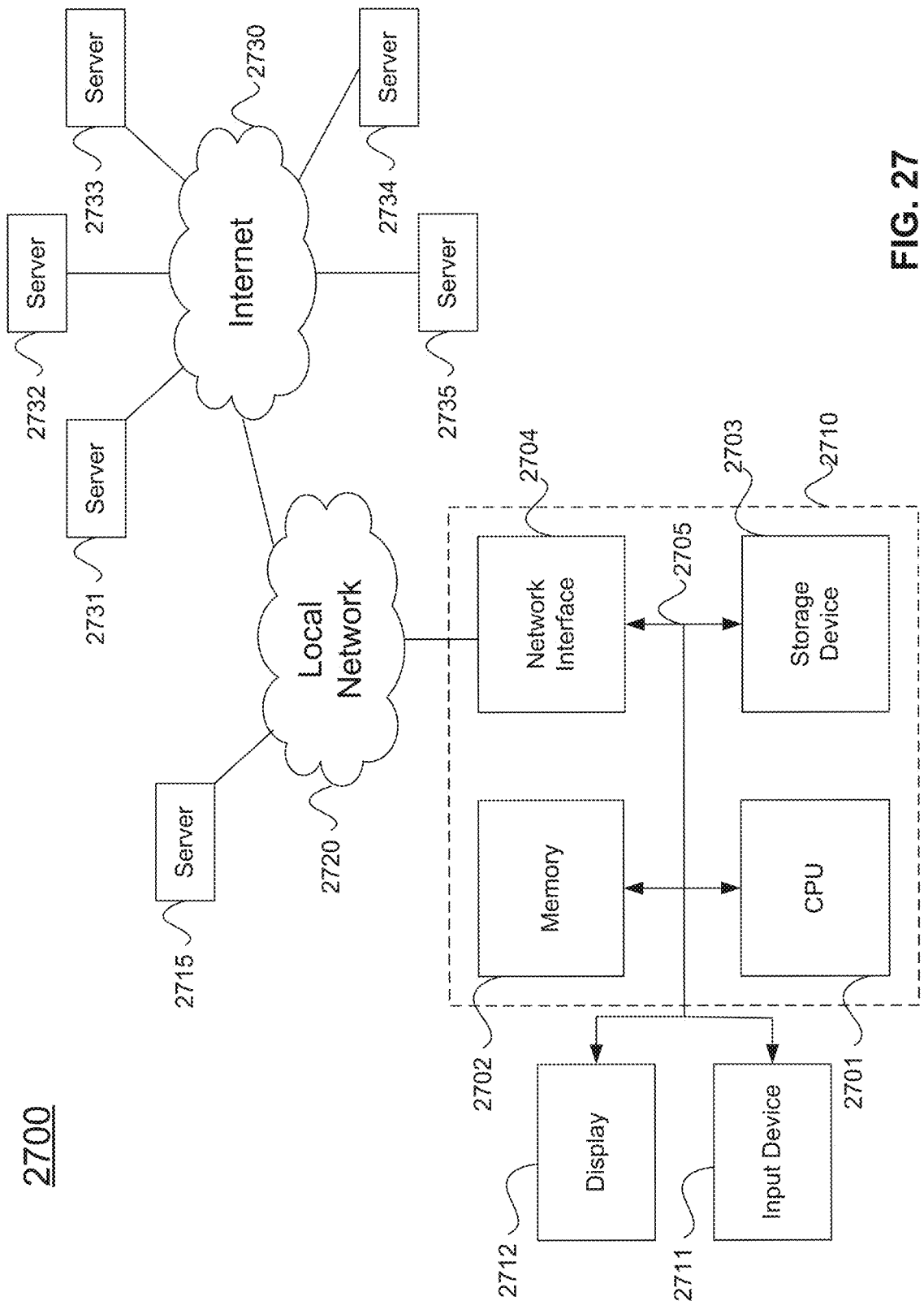
FIG. 27 illustrates an example computer system.

An example computer system 2700 is illustrated in FIG. 27. Computer system 2710 includes a bus 2705 or other communication mechanism for communicating information, and a processor 2701 coupled with bus 2705 for processing information. Computer system 2710 also includes a memory 2702 coupled to bus 2705 for storing information and instructions to be executed by processor 2701, including information and instructions for performing the techniques described above, for example. This memory may also be used for storing variables or other intermediate information during execution of instructions to be executed by processor 2701. Possible implementations of this memory may be, but are not limited to, random access memory (RAM), read only memory (ROM), or both. A storage device 2703 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 2703 may include source code, binary code, or software files for performing the techniques above, for example. Storage device and memory are both examples of computer readable mediums.

Computer system 2710 may be coupled via bus 2705 to a display 2712, such as a Light Emitting Diode (LED) or liquid crystal display (LCD), for displaying information to a computer user. An input device 2711 such as a keyboard and/or mouse is coupled to bus 2705 for communicating information and command selections from the user to processor 2701. The combination of these components allows the user to communicate with the system. In some systems, bus 2705 may be divided into multiple specialized buses.

Computer system 2710 also includes a network interface 2704 coupled with bus 2705. Network interface 2704 may provide two-way data communication between computer system 2710 and the local network 2720. The network interface 2704 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 1104 sends and receives electrical, electromagnetic, or optical signals that carry digital data streams representing various types of information.

Computer system 2710 can send and receive information, including messages or other interface actions, through the network interface 2704 across a local network 2720, an Intranet, or the Internet 2730. For a local network, computer system 2710 may communicate with a plurality of other computer machines, such as server 2715. Accordingly, computer system 2710 and server computer systems represented by server 2715 may form a cloud computing network, which may be programmed with processes described herein. In the Internet example, software components or services may reside on multiple different computer systems 2710 or servers 2731-2735 across the network. The processes described above may be implemented on one or more servers, for example. A server 2731 may transmit actions or messages from one component, through Internet 2730, local network 2720, and network interface 2704 to a component on computer system 2710. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer implemented method comprising:
receiving changes to a plurality of application service configurations of an application comprising a plurality of services;
in response to receiving the changes to the plurality of application service configurations, generating homogeneous clusters of dedicated service level cache nodes, wherein each service of the plurality of services is associated with a subset of nodes in the homogenous clusters of dedicated service level cache nodes, wherein each node of the subset of nodes is associated with a rank, wherein groupings of the application service configurations are cached in the homogenous clusters of dedicated service level cache nodes such that, for each service, the application service configurations associated with the service are cached on the subset of nodes associated with the service according to an order, wherein the order is based on the rank associated with each node in the subset of nodes and identical for each subset of nodes associated with each service of the plurality of services;
generating, by the application, an application output based on one of the plurality of services;
receiving, from a user, a request selecting one or more details of the application output, wherein the one or more details are configured to be geographical data, time data, threshold data, rate data, or natural language terms;
traversing the homogeneous clusters of dedicated service level cache nodes by comparing the rank of neighboring nodes in the subset of nodes to generate a path, the path corresponding to particular nodes that have been traversed;
based upon the path, selecting a template of a plurality of templates, wherein the templates comprise natural language text and one or more blanks corresponding to an omission of one or more elements of the natural language text;
receiving an outcome, the outcome comprising:
the path and the template having data inserted from the path;
processing the outcome based on a reward-based reinforcement model to produce a second outcome;
processing the second outcome based on an input to produce a third outcome, wherein the input is based on a historical correctness value associated with the reward-based reinforcement model;
processing the third outcome according to a challenge function configured to create an outcome in response to the user challenging whether the application output is correct or failed to be proved correct, wherein the challenge function indicates a probability that the template is correct, wherein the outcome comprises language corresponding to the template, wherein the language is configured to explain that the request is correct based on application service configurations that are cached in nodes of the path of traversed nodes; and
communicating the outcome to the application for display with the template.

2. The method as in claim 1 wherein processing the outcome based on the reward-based reinforcement model comprises applying a covariance function to the outcome.

3. The method as in claim 2 wherein the covariance function provides a measure of an association between the outcome and the reward-based reinforcement model.

4. The method as in claim 1 wherein past feedback is supplied to the reward-based reinforcement model from the challenge function.

5. The method as in claim 4 wherein the past feedback comprises a reinforcement model reward or a reinforcement model penalty.

6. The method as in claim 1 wherein processing the third outcome further comprises:
processing the third outcome based on the probability indicated by the challenge function.

7. The method as in claim 1 wherein processing the second outcome comprises applying a correlation function.

8. The method as in claim 1 wherein the challenge function comprises a geometric distribution function.

9. The method as in claim 1 wherein the outcome is modelled as a Poisson distribution.

10. A non-transitory computer readable storage medium embodying a computer program for performing a method, said method comprising:
receiving changes to a plurality of application service configurations of an application comprising a plurality of services;
in response to receiving the changes to the plurality of application service configurations, generating homogenous clusters of dedicated service level cache nodes, wherein each service of the plurality of services is associated with a subset of nodes in the homogenous clusters of dedicated service level cache nodes, wherein each node of the subset of nodes is associated with a rank, wherein groupings of the application service configurations are cached in the homogenous clusters of dedicated service level cache nodes such that, for each service, the application service configurations associated with the service are cached on the subset of nodes associated with the service according to an order, wherein the order is based on the rank associated with each node in the subset of nodes and identical for each subset of nodes associated with each service of the plurality of services;
generating by the application, an application output based on one of the plurality of services;
receiving, from a user, a request selecting one or more details of the application output, wherein the one or more details are configured to be geographical data, time data, threshold data, rate data, or natural language terms;
traversing the homogenous clusters of dedicated service level cache nodes by comparing the rank of neighboring nodes in the subset of nodes to generate a path, the path corresponding to particular nodes that have been traversed;
based upon the path, selecting a template of a plurality of templates, wherein the templates comprise natural language text and one or more blanks corresponding to an omission of one or more elements of the natural language text;
receiving an outcome, the outcome comprising:
the path and the template having data inserted from the path;
processing the outcome based on a reward-based reinforcement model to produce a second outcome;
processing the second outcome based on an input to produce a third outcome, wherein the input is based on a historical correctness value associated with the reward-based reinforcement model;
processing the third outcome according to a challenge function and the the historical correctness value, the challenge function configured to create an outcome in response to the user challenging whether the application output is correct or failed to be proved correct, wherein the challenge function indicates a probability that the template is correct, wherein the outcome comprises language corresponding to the template the request is correct based on application service configurations that are cached in nodes of the path of traversed nodes; and
communicating the outcome to the application for display with the template.

11. The non-transitory computer readable storage medium as in claim 10 wherein processing the outcome based on the reward-based reinforcement model comprises applying a covariance function to the outcome.

12. The non-transitory computer readable storage medium as in claim 11 wherein the covariance function provides a measure of an association between the outcome and the reward-based reinforcement model.

13. The non-transitory computer readable storage medium as in claim 10 wherein processing the third outcome further comprises:
processing the third outcome based on the probability indicated by the challenge function.

14. The non-transitory computer readable storage medium as in claim 10 wherein the challenge function comprises a geometric distribution function.

15. The non-transitory computer readable storage medium as in claim 10 wherein the outcome is modelled as a Poisson distribution.

16. A computer system comprising:
one or more hardware processors;
at least one memory coupled to the at least one of the one or more hardware processors;
one or more non-transitory computer-readable media having stored therein computer-executable instruction that, when executed by the computer system, cause the computer system to:
receive changes to a plurality of application service configurations of an application comprising a plurality of services;
in response to receiving the changes to the plurality of application service configurations, generate homogenous clusters of dedicated service level cache nodes, wherein each service of the plurality of services is associated with a subset of nodes in the homogenous clusters of dedicated service level cache nodes, wherein each node of the subset of nodes is associated with a rank, wherein groupings of the application service configurations are cached in the homogenous clusters of dedicated service level cache nodes such that, for each service, the application service configurations associated with the service are cached on the subset of nodes associated with the service according to an order, wherein the order is based on the rank associated with each node in the subset of nodes and identical for each subset of nodes associated with each service of the plurality of services;
generate, by the application, an application output based on one of the plurality of services;
receive, from a user, a request selecting one or more details of the application output, wherein the one or more details are configured to be geographical data, time data, threshold data, rate data, or natural language terms;
traverse the homogenous clusters of dedicated service level cache nodes by comparing the rank of neighboring nodes in the subset of nodes to generate a path, the path corresponding to particular nodes that have been traversed;

based upon the path, select a template of a plurality of templates, wherein the templates comprise natural language text and one or more blanks corresponding to an omission of one or more elements of the natural language text;

receive an outcome, the outcome comprising:
the path and the template having data inserted from the path;

process the outcome based on a reward-based reinforcement model to produce a second outcome;

process the second outcome based on an input to produce a third outcome, wherein the input is based on a historical correctness value associated with the reward-based reinforcement model;

process the third outcome according to a challenge function configured to create an outcome in response to the user challenging whether the application output is correct or failed to be proved correct, wherein the challenge function indicates a probability that the template is correct, wherein the outcome comprises language corresponding to the template, wherein the language is configured to explain that the request is correct based on application service configurations that are cached in nodes of the path of traversed nodes; and communicate the outcome to the application for display with the template.

17. The computer system as in claim 16 wherein processing the outcome based on the reward-based reinforcement model comprises applying a covariance function to the outcome.

18. The computer system as in claim 16 wherein processing the second outcome comprises applying a correlation function.

19. The computer system as in claim 16 wherein the past feedback is supplied to the reward-based reinforcement model from the challenge function.

20. The computer system as in claim 16 wherein the outcome is modelled as a Poisson distribution.

* * * * *